US012122025B2

(12) United States Patent
Tanaka

(10) Patent No.: US 12,122,025 B2
(45) Date of Patent: Oct. 22, 2024

(54) PNEUMATIC TOOL

(71) Applicant: MAX CO., LTD., Tokyo (JP)

(72) Inventor: Hiroshi Tanaka, Tokyo (JP)

(73) Assignee: Max Co., Ltd., Tokyo (JP)

( * ) Notice: Subject to any disclaimer, the term of this patent is extended or adjusted under 35 U.S.C. 154(b) by 414 days.

(21) Appl. No.: 17/606,740

(22) PCT Filed: Apr. 24, 2020

(86) PCT No.: PCT/JP2020/017801
§ 371 (c)(1),
(2) Date: Oct. 26, 2021

(87) PCT Pub. No.: WO2020/218559
PCT Pub. Date: Oct. 29, 2020

(65) Prior Publication Data

US 2022/0219300 A1 Jul. 14, 2022

(30) Foreign Application Priority Data

Apr. 26, 2019 (JP) ................................ 2019-086671

(51) Int. Cl.
*B25C 1/04* (2006.01)
*B25C 7/00* (2006.01)

(52) U.S. Cl.
CPC .............. *B25C 1/047* (2013.01); *B25C 1/043* (2013.01); *B25C 1/042* (2013.01); *B25C 7/00* (2013.01); *B25D 2250/121* (2013.01)

(58) Field of Classification Search
CPC ......... B25C 1/008; B25C 1/047; B25C 1/043; B25C 1/042; B25C 7/00; B25D 2250/121
See application file for complete search history.

(56) References Cited

U.S. PATENT DOCUMENTS 3,964,659 A * 6/1976 Eiben ...................... B25C 1/043 227/7
2002/0125290 A1* 9/2002 Robinson ................ B25C 1/008 227/8
2010/0301091 A1* 12/2010 Liang ...................... B25C 1/008 227/8
2016/0151900 A1 6/2016 Wu et al.
(Continued)

FOREIGN PATENT DOCUMENTS

JP 06-032308 Y 8/1994
TW 201821229 A 6/2018
WO 2017-115593 A1 7/2017

OTHER PUBLICATIONS

International Search Report for PCT/JP2020/017801 dated Jul. 7, 2020; (5pp).
Written Opinion for PCT/JP2020/017801 dated Jul. 7, 2020; (4pp).

*Primary Examiner* — Thomas M Wittenschlaeger
*Assistant Examiner* — Himchan Song
(74) *Attorney, Agent, or Firm* — Banner & Witcoff, Ltd.

(57) ABSTRACT

A pneumatic tool includes a drive mechanism configured to drive by an air pressure of compressed air, a head valve having a first chamber configured to reserve compressed air that is supplied from an air source, and configured to drive the drive mechanism, according to a state of the compressed air in the first chamber, a trigger valve configured to actuate the head valve by exhausting the compressed air in the first chamber, and a control valve configured to disable actuation of the trigger valve.

8 Claims, 19 Drawing Sheets

(56) References Cited

U.S. PATENT DOCUMENTS

| | | | | |
|---|---|---|---|---|
| 2016/0158927 | A1* | 6/2016 | Largo | B25C 7/00 220/582 |
| 2017/0100827 | A1* | 4/2017 | Yamamoto | B25C 1/043 |
| 2018/0117747 | A1* | 5/2018 | Hahndel | B25C 1/047 |
| 2019/0022842 | A1* | 1/2019 | Oouchi | B25C 1/046 |
| 2019/0344415 | A1 | 11/2019 | Furumi et al. | |
| 2020/0189078 | A1* | 6/2020 | Theberath | B25C 1/008 |
| 2021/0138621 | A1* | 5/2021 | Theberath | B25C 1/008 |

* cited by examiner

PNEUMATIC TOOL

CROSS REFERENCE TO RELATED APPLICATION

This application is a 35 U.S.C. 371 National Phase Entry Application from PCT/JP2020/017801, filed Apr. 24, 2020, which claims priority to Japanese Patent Application No. JP 2019-086671 filed Apr. 26, 2019, the disclosures of which are incorporated herein in their entirety by reference and priority is claimed to each of the foregoing.

TECHNICAL FIELD

The present disclosure relates to a pneumatic tool.

BACKGROUND ART

In the related art, widely used is a nailing machine that includes a main body having a cylinder, a piston provided to be slidable in the cylinder, and a driver connected to the piston, and is configured to drive the piston by compressed air to strike a nail into a to-be-struck member.

The nailing machine using the compressed air includes a head valve configured to control actuation of the piston, a trigger valve configured to actuate the head valve, a trigger mechanism configured to actuate the trigger valve, and a contact arm protruding from a nose provided on a tip end-side of the main body. The nailing machine is configured so that, when the contact arm is pressed against the to-be-struck member in a state where a trigger lever is pulled, a striking operation (hereinafter, referred to as 'contact striking') of striking out a nail to the to-be-struck member can be enabled.

In the contact striking, after striking a nail, nails can be continuously struck each time the contact arm is pressed against the to-be-struck member while the trigger is pulled, which is suitable for a quick operation. On the other hand, suggested is a technology where when a predetermined time elapses without the contact arm being pressed against the to-be-struck member after the trigger is pulled, the head valve is put into non-actuation, so as to regulate a careless operation (refer to PTL 1).

CITATION LIST

Patent Literature

PTL 1: Japanese examined utility model application publication No. H06-32308

SUMMARY OF INVENTION

Technical Problem

However, the nailing machine of the related art disclosed in PTL 1 has following problems. For a timer mechanism, a control using compressed air is generally adopted. However, in most cases, a structure of controlling actuation of the head valve configured to control inflow of the compressed air into the cylinder is used. In the head valve, a flow rate of the compressed air that is caused to flow in or to be exhausted with respect to a chamber increases. As a result, a changing valve configured to control actuation of the head valve is also enlarged. In addition, as the switching valve is enlarged, responsiveness upon actuation of the switching valve is also lowered.

In order to solve the above problems, the present disclosure provides a pneumatic tool capable of miniaturizing a control valve and improving response performance.

Solution to Problem

A pneumatic tool according to one aspect of the present disclosure includes a drive mechanism configured to drive by an air pressure of compressed air, a head valve having a first chamber configured to reserve compressed air that is supplied from an air source, and configured to drive the drive mechanism, according to a state of the compressed air in the first chamber, a trigger valve configured to actuate the head valve by exhausting the compressed air in the first chamber, and a control valve configured to disable actuation of the trigger valve.

In addition, a pneumatic tool according to one aspect of the present disclosure includes a drive mechanism configured to drive by an air pressure of compressed air, a chamber to which the compressed air for driving the drive mechanism is supplied, a head valve configured to drive the drive mechanism by using the compressed air supplied to the chamber, a trigger valve configured to actuate the head valve, a control valve configured to disable actuation of the trigger valve or the head valve, and a timer valve configured to disable actuation of the trigger valve or the head valve by actuating the control valve at a predetermined timing, based on an operation on a trigger, wherein the timer valve has a valve body capable of moving to an actuation position in which the valve body acts on the control valve when a predetermined time elapses, wherein a moving range of the valve body includes a first section in which the predetermined time is measured and a second section in which the valve body acts on the control valve, and wherein a resistance to the valve body is different between the first section and the second section.

Advantageous Effects of Invention

According to the pneumatic tool according to one aspect of the present disclosure, the actuation of the head valve can be controlled by disabling the actuation of the trigger valve by the control valve, so that the control valve can be made small. In addition, the control valve is made small, so that responsiveness of the actuation can be improved.

According to the pneumatic tool according to one aspect of the present disclosure, since the moving range of the valve body configured to actuate the control valve is divided into the first section and the second section between which the resistance to the valve body is different, the time measurement can be stabilized in the first section and the control valve can be securely actuated in the second section.

DESCRIPTION OF EMBODIMENTS

Hereinafter, favorable embodiments of the present disclosure will be described in detail with reference to the accompanying drawings. Note that, in the specification and drawings, the constitutional elements having substantially the same functional configurations are denoted with the same reference signs, and the overlapping descriptions are omitted.

First Embodiment

[Configuration Example of Nailing Machine 100]

Figure 1:
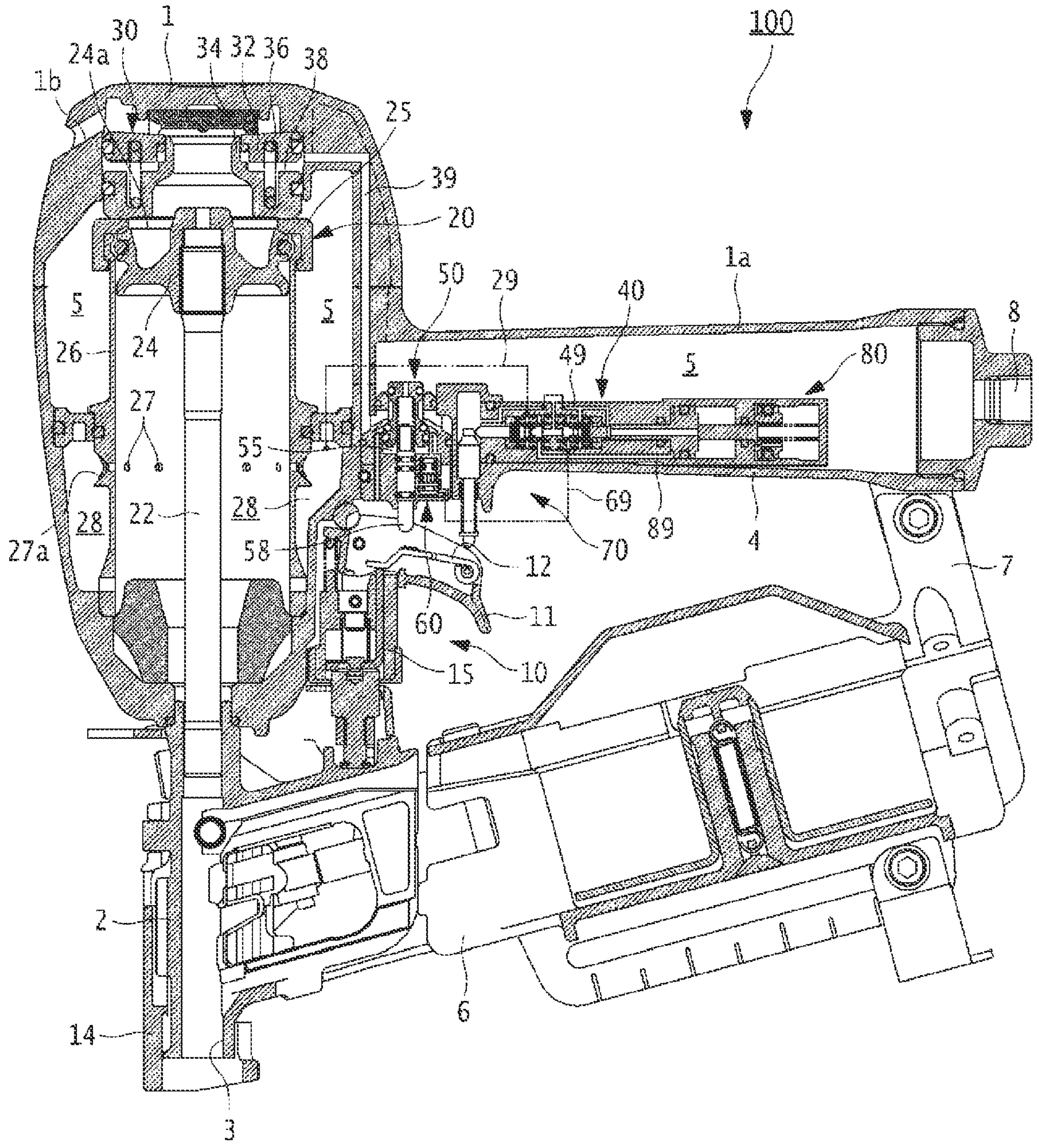
FIG. 1 is a side sectional view of a nailing machine according to a first embodiment.
Figure 2:
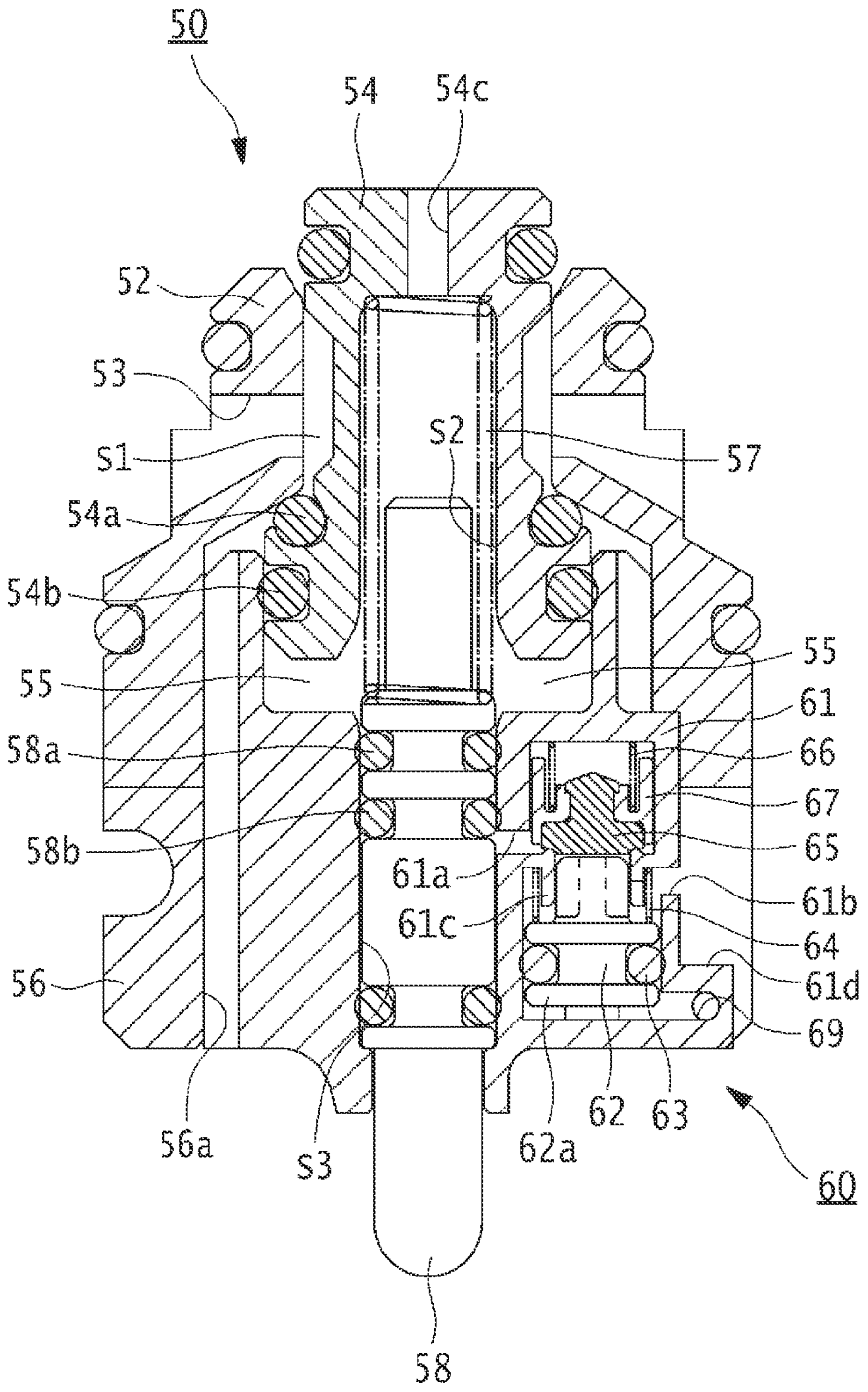
FIG. 2 is a side sectional view of a trigger valve and a second control valve according to the first embodiment.
Figure 3:
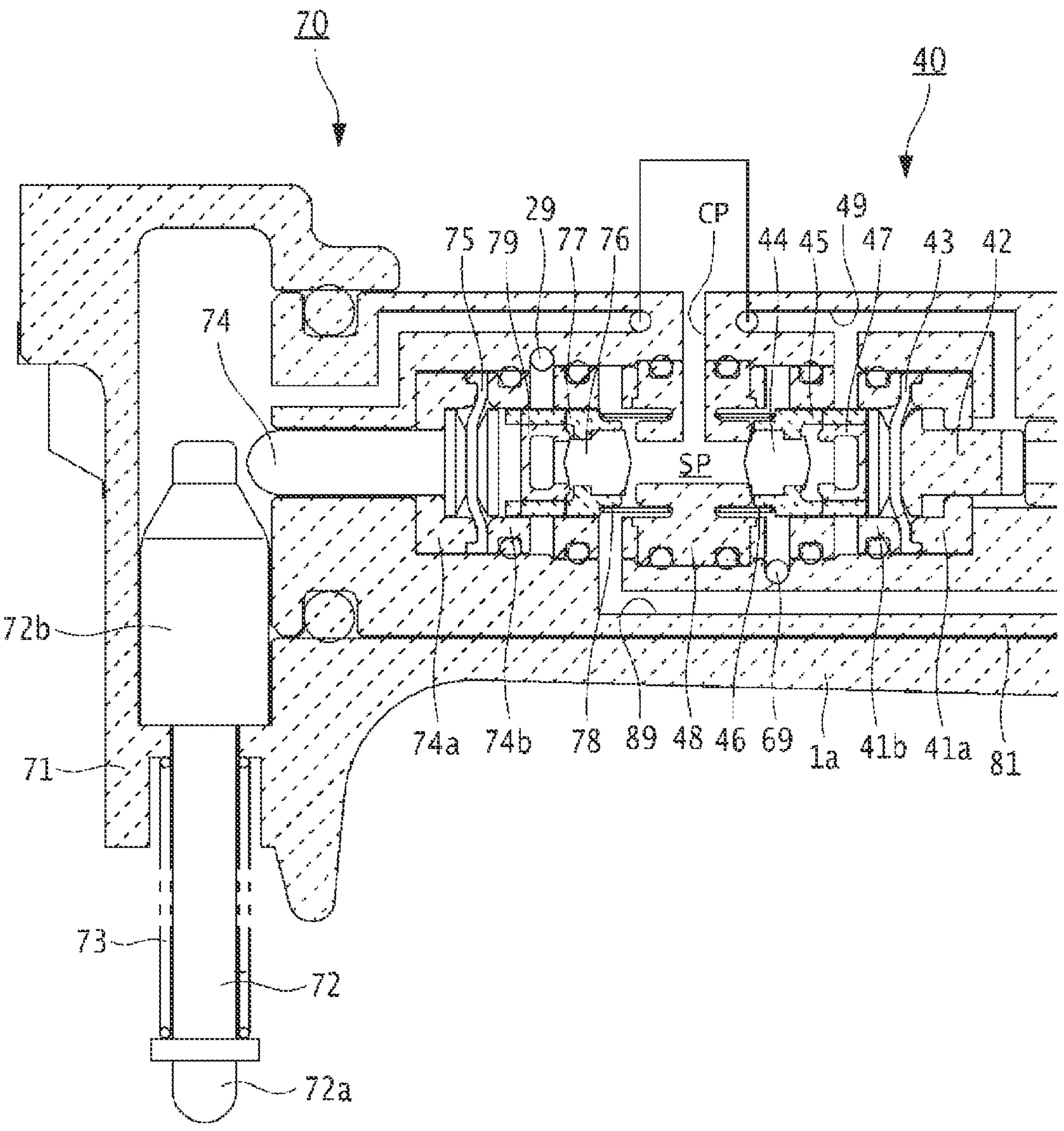
FIG. 3 is a side sectional view of a switch valve and a first control valve according to the first embodiment.
Figure 4:
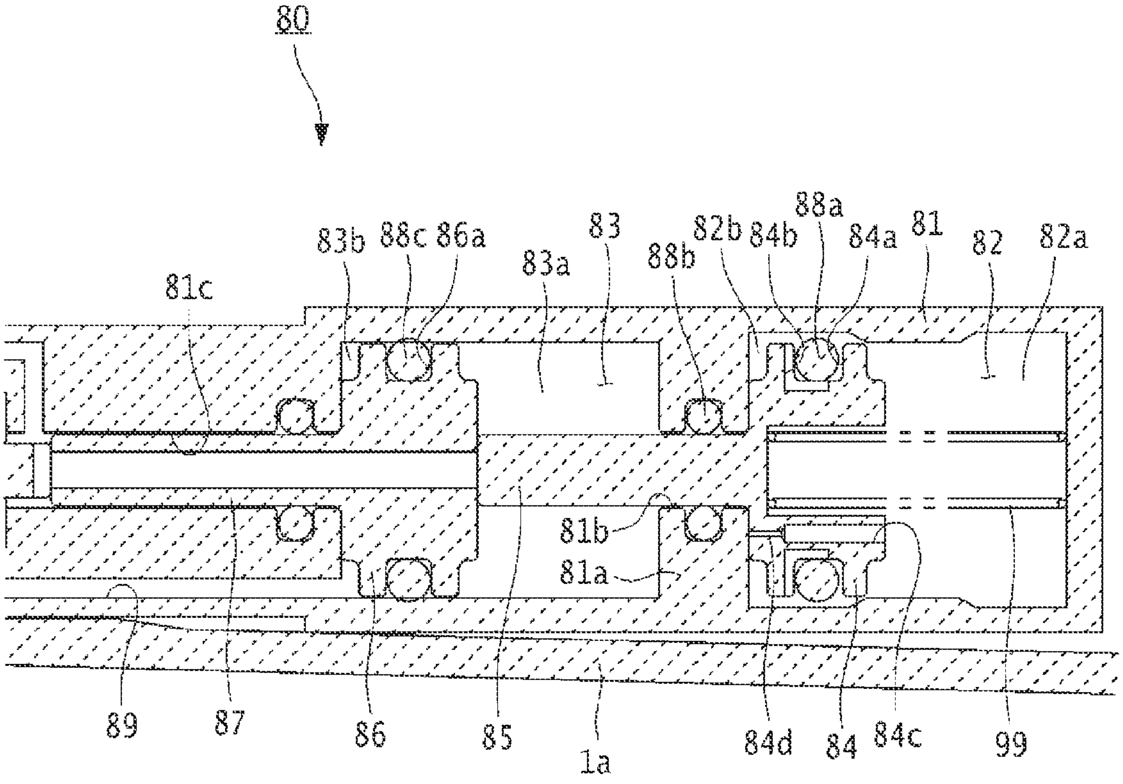
FIG. 4 is a side sectional view of a timer valve according to the first embodiment.

FIG. 1 is a side sectional view of a nailing machine 100 according to a first embodiment. FIG. 2 is a side sectional view of a trigger valve 50 and a second control valve 60 according to the first embodiment. FIG. 3 is a side sectional view of a switch valve 70 and a first control valve 40 according to the first embodiment. FIG. 4 is a side sectional view of a timer valve 80 according to the first embodiment.

The nailing machine 100 is an example of the pneumatic tool, and includes, as shown in FIG. 1, a main body 1 having a nose part 2, a grip part 4 that is gripped by an operator, and a magazine part 6 in which nails to be struck into a to-be-struck member are loaded. Housings of the main body 1 and the grip part 4 are integrally formed by a housing 1*a*, for example. The nailing machine 100 also includes a head valve 30, a trigger mechanism 10, a trigger valve 50, a second control valve 60, a switch valve 70, a first control valve 40, and a tinier valve 80.

Note that, in the present embodiment, the nose part 2-side of the nailing machine 100 is referred to as a lower side of the nailing machine 100, and an opposite side thereto is referred to as an upper side of the nailing machine 100. Also, the main body 1-side of the nailing machine 100 is referred to as a front side of the nailing machine 100, and the grip part 4-side of the nailing machine 100 is referred to as a rear side of the nailing machine 100.

An inside of the main body 1 is hollow, and a striking mechanism (drive mechanism) 20 configured to drive by an air pressure of compressed air is arranged in the main body 1. The striking mechanism 20 has a driver 22, a piston 24, and a cylinder 26. The driver 22 is configured to reciprocally move in the upper and lower direction (axial direction) in the cylinder 26, and to impact a head portion of a nail delivered from the magazine part 6, thereby striking the nail into a to-be-struck member. The piston 24 is connected to an upper end portion of the driver 22, and is configured to reciprocally move in the cylinder 26, in response to the compressed air flowing into a piston upper chamber 24*a* provided on an upper side of the cylinder 26. The cylinder 26 is a cylindrical body, is arranged in the housing 1*a* constituting the main body 1, and is configured to accommodate the driver 22 and the piston 24 to be reciprocally movable in the upper and lower direction. An annular locking part 25 configured to regulate upward movement of the piston 24 is provided between the piston 24 and the head valve 30.

A lower end portion of the main body 1 is provided with the nose part 2. The nose part 2 protrudes downward from the lower end portion of the main body 1 by a predetermined length. The nose part 2 is formed with an ejection port 3 for striking out the nail delivered by the driver 22 to an outside. The ejection port 3 is arranged coaxially with the driver 22 and the cylinder 26.

A main chamber 5 in which the compressed air is supplied and filled is provided between an inner wall on an upper side of the main body 1 and an outer peripheral part on an upper side of the cylinder 26 and in the grip part 4. A blow back chamber 28 for returning the piston 24 to a top dead center is provided between an inner wall on a lower side of the main body 1 and an outer peripheral part on a lower side of the cylinder 26. One end portion of a first connection passage 29 configured to communicate with the switch valve 70 is configured to communicate with the blow back chamber 28.

A plurality of small holes 27 is formed at predetermined intervals in a substantially intermediate position in the axial direction of the cylinder 26 and in a circumferential direction of the cylinder 26. The plurality of small holes 27 is formed to communicate with the blow back chamber 28 via a check valve 27*a* provided to the cylinder 26. Note that, when the piston 24 is located at a bottom dead center below the small holes 27, the compressed air in the cylinder 26 is caused to flow into the blow back chamber 28 via the small holes 27. In addition, when the piston 24 is located at the top dead center, the compressed air in the blow back chamber 28 is discharged to the atmosphere, so that the inside of the blow back chamber 28 becomes an atmospheric pressure.

The head valve 30 is configured to perform supply and shut-off of the compressed air to the cylinder 26, and to drive the striking mechanism 20 by using the compressed air supplied from the main chamber 5. The head valve 30 has a base part 32 and a movable part 34. The base part 32 is arranged on an upper end-side of the main body 1, and the movable part 34 is arranged below the base part 32. The movable part 34 is urged toward the cylinder 26 at a predetermined interval from the base part 32 by an urging spring 36 interposed between the base part 32 and the movable part 34. A lower surface of the movable part 34 is in contact with an upper surface of the locking part 25 in an urging state (a state where the head valve 30 is off), so that the main chamber 5 and the piston upper chamber 24*a* are shut off therebetween.

The interval between the base part 32 and the movable part 34 is configured to function as a head valve chamber 38 to which the compressed air in the main chamber 5 is supplied. One end portion of a second connection passage 39 is configured to communicate with the head valve chamber 38, and the other end-side of the second connection passage 39 is configured to communicate with the trigger valve 50. The movable part 34 is configured to slide along an inner wall of the housing 1*a* constituting the main body 1 and to open/close between the piston upper chamber 24*a* and the main chamber 5, according to a state of the compressed air in the head valve chamber 38. The piston upper chamber 24*a* is configured to communicate with an outside via an opening portion 1*b* formed in the housing 1*a*.

The grip part 4 is attached to a side part on the rear side of the main body 1 in a direction substantially orthogonal to an extension direction of the main body 1 (an axial direction of the cylinder 26), A rear end portion of the grip part 4 is provided with an air plug 8. One end portion of an air hose (not shown) is connected to the air plug 8, and the other end portion of the air hose is connected to a compressor (not shown). The air compressor is configured to generate the compressed air for driving the striking mechanism 20 and to supply the generated compressed air into the main chamber 5 via the air hose and the air plug 8.

The trigger mechanism 10 has a trigger lever 11, a contact lever 12, a contact arm 14 and a pressing member 15. The trigger lever 11 is a lever for turning on (actuating) the switch valve 70, and is attached to a side surface on the rear side of the main body 1 and a lower side of the grip part 4 so as to be rotatable about a shaft part as a fulcrum. The contact lever 12 is arranged in the trigger lever 11 and is configured to rotate about a front end-side as a fulcrum in conjunction with the trigger lever 11. A front end portion of the contact lever 12 is urged downward by, for example, a torsion spring provided on a rear end-side, and is in contact with an upper end face of the pressing member 15. Note that, the contact lever 12 may not be urged by the spring.

The contact arm 14 is attached to an outer peripheral part of the nose part 2 in a state of protruding downward from a lower end portion of the nose part 2. The contact arm 14 is urged downward by a spring (not shown), and is configured to reciprocally move in the upper and lower direction relative to the nose part 2 in conjunction with a pressing operation against the to-be-struck member. The pressing member 15 is connected to the contact arm 14, and is configured to push up a front end-side of the contact lever 12 in conjunction with upward movement of the contact arm 14. Thereby, a trigger valve stem 58 of the trigger valve 50 is pushed up, so that the trigger valve 50 is actuated (turned on).

The magazine part 6 is configured so that a series of connected connecting nails can be loaded therein, and is provided on a lower side of the grip part 4. A front end-side of the magazine part 6 is connected to the nose part 2, and a rear end-side of the magazine part 6 is connected to the grip part 4 via an attaching arm part 7. The connecting nails loaded in the magazine part 6 are guided to the ejection port 3 of the nose part 2 by a feeding claw provided to be slidable with respect to the nose part 2, and is struck into the to-be-struck member by the descending driver 22.

As shown in FIGS. 1 and 2, the trigger valve 50 is configured to actuate the head valve 30 based on a pressing state of the contact arm 14 against the to-be-struck member. The trigger valve 50 is arranged on a front end-side of the grip part 4 and near the switch valve 70. The trigger valve 50 has a housing 52, a pilot valve 54, a cap 53 and a trigger valve stem 58.

The housing 52 has a passage 53 provided in a substantially intermediate portion in the upper and lower direction. The passage 53 is configured to communicate with one end portion of the second connection passage 39 configured to communicate with the head valve 30. The passage 53 is also configured to be able to communicate with an air exhaust passage 56*a* upon turning-on of the trigger valve 50.

The pilot valve 54 is arranged at a gap S1 on an inner side of the housing 52. O-rings 54*a* and 54*b* are attached at a predetermined interval in the upper and lower direction to a peripheral edge portion on a lower side of the pilot valve 54. The O-ring 54*a* is configured to shut off a passage between the passage 53 and the air exhaust passage 56*a* to thus prevent the compressed air in the head valve chamber 38 from being leaked from the passage 53 to an outside, during non-actuation of the trigger valve 50. In addition, the O-ring 54*a* is pressed against an inner wall of the housing 52 to regulate upward movement of the pilot valve 54. The O-ring 54*b* is configured to shut off between an empty chamber 55, which will be described later, and the air exhaust passage 56*a*.

The cap 56 is attached on an inner side of the housing 52 with an empty chamber 55 being interposed between the cap and the pilot valve 54 on the upper side. The empty chamber 55 is configured to communicate with the main chamber 5 via a gap S2 between the pilot valve 54 and the trigger valve stem 58 and a passage 54*c* of the pilot valve 54 and to function as a chamber in which the compressed air is filled, during non-actuation of the trigger valve 50. Note that, in the present embodiment, a volume of the empty chamber 55 of the trigger valve 50 for reserving the compressed air is configured smaller than a volume of the head valve chamber 38 of the head valve 30 for reserving the compressed air. For this reason, the inflow and outflow amounts of the compressed air with respect to the empty chamber 55 of the trigger valve 50 are smaller than the inflow and outflow amounts of the compressed air with respect to the head valve chamber 38 of the head valve 30.

The trigger valve stem 58 is arranged on inner sides of the pilot valve 54 and the cap 56, and is provided to be movable in the upper and lower direction from the cap 56 as a point of origin. An upper end-side of the trigger valve stem 58 is urged toward the contact lever 12 (toward the lower side) by a compression spring 57. The compression spring 57 is interposed between the pilot valve 54 and the trigger valve stem 58, and is adapted to expand and contract, in response to pressing of the trigger valve stem 58. A lower end portion of the trigger valve stem 58 protrudes from a lower surface of the cap 56 by a predetermined length, and can come into contact with the contact lever 12 (refer to FIG. 1). O-rings 58*a* and 58*b* are attached at a predetermined interval in the upper and lower direction to a peripheral edge portion of a substantially intermediate position in the upper and lower direction of the trigger valve stem 58. The O-rings 58*a* and 58*b* are configured to prevent the compressed air in the empty chamber 55 from being leaked from a gap S3 between the trigger valve stem 58 and the cap 56 to an outside, during non-actuation of the trigger valve 50.

The air exhaust passage 56*a* is provided between the housing 52 and the cap 56. When the empty chamber 55 is closed due to push-up of the trigger valve stem 58 during actuation of the trigger valve 50, the air exhaust passage 56*a* communicates with the passage 53 to exhaust the compressed air in the head valve chamber 38 to the atmosphere.

As shown in FIGS. 1 and 2, the second control valve 60 is incorporated into the trigger valve 50, and is configured to disable actuation of the trigger valve 50 after the prescribed time by time measurement of the timer valve 80 elapses. The second control valve 60 has a cylinder 61, a control valve stem 62, and a seal member 65.

The cylinder 61 is a hollow cylindrical body extending in the upper and lower direction, and is arranged at a lower part on a rear side of the trigger valve 50 and in a position near the trigger valve stem 58. A first passage 61*a* configured to communicate with the empty chamber 55 of the trigger valve 50 is formed in a substantially intermediate position in the upper and lower direction of a front wall of the cylinder 61. A second passage 61*b* configured to communicate with an air exhaust passage 61*d* is formed in a substantially intermediate position in the upper and lower direction of a rear wall of the cylinder 61. A lower part of the rear wall of the cylinder 61 is configured to communicate with one end portion of a fourth connection passage 69 configured to communicate with the first control valve 40. A support portion 61*c* for supporting a spring 64, which will be described later, is provided on an inner wall of the cylinder 61.

The control valve stem 62 is a columnar body extending in the upper and lower direction and can slide in the upper and lower direction in the cylinder 61. An attaching portion 62*a* provided on a lower side of the control valve stem 62 is mounted with an O-ring 63 for shutting off between the fourth connection passage 69 and the first passage 61*a* and second passage 61*b* along a circumferential direction thereof. The control valve stem 62 is urged downward by a spring 64. The spring 64 is interposed between the attaching portion 62*a* and the support portion 61*c*, and is adapted to expand and contract, in response to the compressed air that is supplied from the timer valve 80. For the spring 64, for example, a compression spring or a coil spring can be used. When the compressed air is supplied between a bottom surface in the cylinder 61 and a lower surface of the control valve stem 62 from the fourth connection passage 69, the control valve stem 62 ascends against an elastic force of the spring 64, with respect to the bottom surface in the cylinder 61. On the other hand, when the compressed air between the bottom surface in the cylinder 61 and the lower surface of the control valve stem 62 is exhausted via the fourth connection passage 69, the control valve stem 62 descends from an ascending position in the cylinder 61 and comes into contact with the bottom surface.

The seal member 65 is arranged in the cylinder 61 and above the control valve stem 62. The seal member 65 is integrally attached to an attachment member 67, and is urged downward by a spring 66 inserted between the attachment member 67 and a top surface in the cylinder 61. The seal member 65 is configured to be pushed up against an elastic force of the spring 66 as the control valve stem 62 ascends, thereby opening the first passage 61*a* to communicate the first passage 61*a* and the second passage 61*b*. Thereby, the empty chamber 55 and the air exhaust passage 61*d* communicate with each other via the first passage 61*a* and the second passage 61*b*. In addition, the seal member 65 is configured to be pushed down as the control valve stem 62 descends, thereby closing the first passage 61*a* to shut off a path between the first passage 61*a* and the second passage 61*b*.

The switch valve 70 is arranged between the first control valve 40 and the second control valve 60, and is configured to actuate the timer valve 80 based on a pulling operation on the trigger lever 11. The switch valve 70 has a cylinder 71, a switch valve stem 72, a pressing member 74, a diaphragm 75, and a seal member 76.

The cylinder 71 is a hollow cylindrical body extending in the upper and lower direction, and is configured to accommodate the switch valve stem 72 so as to be slidable in the upper and lower direction. The cylinder 71 is fitted with a front end-side of a common cylinder 81 and is connected with one end portion of a third connection passage 49 formed in the common cylinder 81. An inside of the cylinder 71 is configured to communicate with an outside, and is at the atmospheric pressure. A lower surface-side of the common cylinder 81 constituting the switch valve 70 is configured to communicate with one end portion of a sixth connection passage 89 configured to communicate with the timer valve 80. An upper surface-side of the common cylinder 81 constituting the switch valve 70 is configured to communicate with the other end portion of the first connection passage 29 configured to communicate with the blow back chamber 28.

The switch valve stem 72 is a columnar body extending in the upper and lower direction and is arranged to be slidable in the upper and lower direction in the cylinder 71. The switch valve stem 72 is urged toward the trigger lever 11 (toward the lower side) by a compression spring 73 inserted between a lower end-side of the switch valve stem 72 and a lower surface of the cylinder 71. A lower end portion 72*a* of the switch valve stem 72 protrudes downward from the lower surface of the cylinder 71, and is provided to be able to come into contact with the contact lever 12 (refer to FIG. 1). The switch valve stem 72 is configured to be pushed up by the contact lever 12 and to ascend against an elastic force of the spring 73 in the cylinder 71, during a pulling operation of the trigger lever 11.

The pressing member 74 is a columnar body extending in the front and rear direction, and a front end portion thereof is provided to protrude from the common cylinder 81-side into the cylinder 71. The pressing member 74 facing toward the inside of the cylinder 71 collides with an upper end portion 72*b* of the switch valve stem 72 by push-up of the switch valve stem 72 and is pressed backward. Specifically, in the pressing member 74, an operation in the upper and lower direction of the switch valve stem 72 is converted into an operation in the front and rear direction. A rear end-side of the pressing member 74 is locked by a fixing member 74*a*, so that the pressing member 74 is not separated toward the cylinder 71.

The diaphragm 75 is an elastically deformable thin film made of a resin material such as rubber, and separates an atmospheric pressure region on the switch valve stem 72-side and a compressed air region on the seal member 76-side. The diaphragm 75 is attached to a rear end-side of the pressing member 74, and is configured to move in the front and rear direction in the cylinder 71 in conjunction with an operation of the pressing member 74. A peripheral edge portion of the diaphragm 75 is attached in a state of being sandwiched by fixing members 74*a* and 74*b*.

The seal member 76 is made of a resin material such as rubber, for example, and is integrally attached to an attachment member 77. The attachment member 77 is urged forward by a spring 78 inserted between a rear end-side of the attachment member 77 and a common support part 48. A to-be-sealed member 79 is provided to be able to come into contact with the seal member 76 configured to move in the front and rear direction, and is configured to regulate forward movement of the seal member 76.

During pressing of the pressing member 74, the seal member 76 is configured to move backward against an elastic force of the spring 78, thereby shutting off between a common passage CP configured to communicate with the main chamber 5 and a sixth connection passage 89 configured to communicate with the tinier valve 80 and communicating the sixth connection passage 89 configured to communicate with the timer valve 80 and the first connection passage 29 configured to communicate with the blow back chamber 28 at the atmospheric pressure each other. On the other hand, during non-pressing of the pressing member 74, the seal member 76 is configured to connect the common passage CP configured to communicate with the main chamber 5 and the sixth connection passage 89 configured to communicate with the timer valve 80 each other and to shut off between the sixth connection passage 89 configured to communicate with the timer valve 80 and the first connection passage 29 configured to communicate with the blow back chamber 28.

An empty chamber SP is provided in the common cylinder 81 and between the seal member 76 of the switch valve 70 and a seal member 44 of the first control valve 40. The empty chamber SP is configured to communicate with one end portion of the common passage CP configured to communicate with the main chamber 5. The empty chamber SP can communicate with each of the common passage CP, the fourth connection passage 69 and the sixth connection passage 89.

As shown in FIGS. 1 and 3, the first control valve 40 is configured to be actuated by the timer valve 80, and to control supply of the compressed air for actuating the second control valve 60. In the present embodiment, the first control valve 40 is arranged in the common cylinder 81 that is common to the switch valve 70 and the timer valve 80. The first control valve 40 has a pressing member 42, a diaphragm 43, and a seal member 44. The respective components such as the pressing member 42 of the first control valve 40 have configurations that are common to the respective components such as the pressing member 74 of the switch valve 70, and are arranged in symmetrical positions, respectively.

A lower surface-side of the common cylinder 81 constituting the first control valve 40 is configured to communicate with the other end portion of the fourth connection passage 69 configured to communicate with the second control valve 60. An upper surface-side of the common cylinder 81 constituting the switch valve 70 is configured to communicate with the other end portion of the third connection passage 49 configured to communicate with the inside of the cylinder 71 of the switch valve 70.

The pressing member 42 is a substantially columnar body extending in the front and rear direction, and is configured to move forward as a rear end face is pressed by the timer valve 80, which will be described later. A front end-side of the pressing member 42 is locked by a fixing member 41*a*, so that the pressing member 42 is not separated toward the timer valve 80.

The diaphragm 43 is constituted by an elastically deformable thin film made of a resin material such as rubber, for example. The diaphragm 43 is attached to a tip end-side of the pressing member 42, and is configured to move in the front and rear direction in the common cylinder 81 in conjunction with an operation of the pressing member 42. A peripheral edge portion of the diaphragm 43 is attached in a state of being sandwiched by fixing members 41*a* and 41*b*.

The seal member 44 is made of a resin material such as rubber, for example, and is attached to an attachment member 45. The attachment member 45 is urged forward by a spring 46 inserted between a front end-side of the attachment member 45 and the common support part 48. A to-be-sealed member 47 is provided to be able to come into contact with the seal member 44 configured to move in the front and rear direction, and is configured to regulate backward movement of the seal member 44.

During non-pressing of the pressing member 42, the seal member 44 is configured to come into contact with the to-be-sealed member 47, thereby connecting the common passage CP configured to communicate with the main chamber 5 and the fourth connection passage 69 configured to communicate with the second control valve 60 each other. On the other hand, during pressing of the pressing member 42, the seal member 44 is configured to move forward against an elastic force of the spring 46 and to separate from the to-be-sealed member 47, thereby connecting the fourth connection passage 69 configured to communicate with the second control valve 60 and the third connection passage 49 configured to communicate with the inside of the cylinder 71 of the switch valve 70 each other.

As shown in FIGS. 1 and 4, when the prescribed time elapses in a state where the trigger lever 11 is pulled, the timer valve 80 actuates the first control valve 40, the second control valve 60 and the like, thereby restricting the striking operation. Specifically, the tinier valve 80 is configured to be actuated based on an operation on the trigger lever 11 and to actuate the first control valve 40 and the second control valve 60 at a predetermined timing, thereby disabling actuation of the head valve 30. The timer valve 80 has a common cylinder 81, a first timer piston 84, a first piston shaft part 85, a second timer piston 86, and a second piston shaft part 87.

The common cylinder 81 is a hollow cylindrical body extending in the front and rear direction, and is configured to accommodate the first timer piston 84 and the second timer piston 86 so as to be slidable in the front and rear direction. An inside of the common cylinder 81 is partitioned into a first chamber 82 and a second chamber 83, via a partition portion 81*a*. The first chamber 82 is constituted by a sealed closed space, and an inside of the first chamber 82 is filled with an atmospheric air. Thereby, the compressed air, trash and the like cannot flow into the first chamber 82 from other spaces.

The first timer piston 84 is a cylindrical body having substantially the same diameter as an inner diameter of the common cylinder 81 and is configured to slide in the front and rear direction in the common cylinder 81. The first timer piston 84 is urged toward the first control valve 40 (toward the front side) by a compression spring 99. The compression spring 99 is inserted between a concave portion formed on a base end-side of the first timer piston 84 and a rear wall in the first chamber 82, and is adapted to expand and contract, in response to the compressed air flowing in or flowing out with respect to the common cylinder 81. A peripheral edge portion of the first timer piston 84 is formed with a concave portion 84*a* along a circumferential direction thereof. In the concave portion 84*a*, an O-ring 88*a* for sealing between the concave portion and an inner wall of the common cylinder 81 is mounted. Thereby, the first chamber 82 is further partitioned into a first space 82*a* on a rear side of the O-ring 88*a* and a second space 82*b* on a front side of the O-ring 88*a*.

The O-ring 88*a* is mounted in a state where the O-ring 88*a* can move in the front and rear direction in the concave portion 84*a*, i.e., in a state where a play is provided. The concave portion 84*a* is formed with a bypass passage 84*b* for causing the atmospheric air in the second space 82*b* to flow to the first space 82*a* when the O-ring 88*a* is in close contact with a front wall in the concave portion 84*a*.

In the present embodiment, when the first timer piston 84 is advanced, the O-ring 88*a* is moved backward in the concave portion 84*a* to seal between the O-ring and the rear wall in the concave portion 84*a*. For this reason, in this case, the atmospheric air does not flow from the second space 82*b* into the first space 82*a* via the concave portion 84*a*. On the other hand, when the first timer piston 84 is retreated, the O-ring 88*a* is moved forward in the concave portion 84*a* to seal between the O-ring and the front wall of the concave portion 84*a*. However, since the bypass passage 84*b* is opened, the atmospheric air flows from the first space 82*a* into the second space 82*b* via the concave portion 84*a*. In this way, in the present embodiment, the O-ring 88*a*, the concave portion 84*a* and the bypass passage 84*b* function as a check valve.

The concave portion 84*a* of the first timer piston 84 is formed with a passage 84*c* penetrating in the front and rear direction (thickness direction) of the first timer piston 84, so that the atmospheric air can flow from the second space 82*b*-side into the first space 82*a*-side via the passage 84*c*. The passage 84*c* is provided with a throttle portion 84*d*. The throttle portion 84*d* is constituted by reducing a cross-sectional area (narrowing a width) of a path of a part of the passage 84*c*, and is configured to restrict a flow rate per unit time of the atmospheric air, which flows from the second space 82*b* into the first space 82*a*, to be constant. Thereby, it is possible to control the moving speed of the first timer piston 84 until the first control valve 40 can be actuated.

The first piston shaft part 85 is a rod-shaped columnar body, and a rear end portion of the first piston shaft part 85 is integrally formed with a front end portion of the first timer piston 84. The first piston shaft part 85 passes through a through-hole 81*b* formed in the partition portion 81*a*, and extends from an inside of the first chamber 82 into the second chamber 83. A front end face of the first piston shaft part 85 is attached to a rear end face of the second timer piston 86 and is configured to be able to transmit the pressing force of the first timer piston 84 to the second timer piston 86. An O-ring 88*b* is provided to the partition portion 81*a* to secure a sealed state of the inside of the first chamber 82.

The second timer piston 86 is a cylindrical body having substantially the same diameter as an inner diameter of the common cylinder 81, and is arranged to be slidable in the second chamber 83. A peripheral edge portion of the second timer piston 86 is formed with a concave portion 86*a* along a circumferential direction thereof. In the concave portion 86*a*, an O-ring 88*c* for sealing between the concave portion and the inner wall of the common cylinder 81 is mounted. Thereby, the second chamber 83 is further partitioned into a first space 83*a* on a rear side of the O-ring 88*c* and a second space 83*b* on a front side of the O-ring 88*c*.

One end portion of the sixth connection passage 89 configured to communicate with the switch valve 70 is configured to communicate with the second space 83*b*, so that the compressed air can be supplied into the second space 83*b* or the compressed air can be exhausted from the second space 83*b*.

The second piston shaft part 87 is a rod-shaped columnar body, and a rear end portion of the second piston shaft part 87 is integrally attached to a front end portion of the second timer piston 86. A front end-side of the second piston shaft part 87 is arranged to be slidable in a through-hole 81*c* formed between the second timer piston 86 and the first control valve 40. A front end portion of the second piston shaft part 87 is provided to appear and disappear with respect to the inside of the common cylinder 81 of the first control valve 40, and is configured to actuate the first control valve 40 by pressing a rear end face of the pressing member 42 constituting the first control valve 40.

[Operation Example of Nailing Machine 100]

Subsequently, an example of a striking operation of the nailing machine 100 according to the first embodiment is described. FIGS. 5 to 11 show a striking operation in the nailing machine 100 according to the first embodiment. FIGS. 12A to 12E show an example of an operation of the trigger valve 50 during the striking operation in the nailing machine 100 according to the first embodiment.

Figure 5:
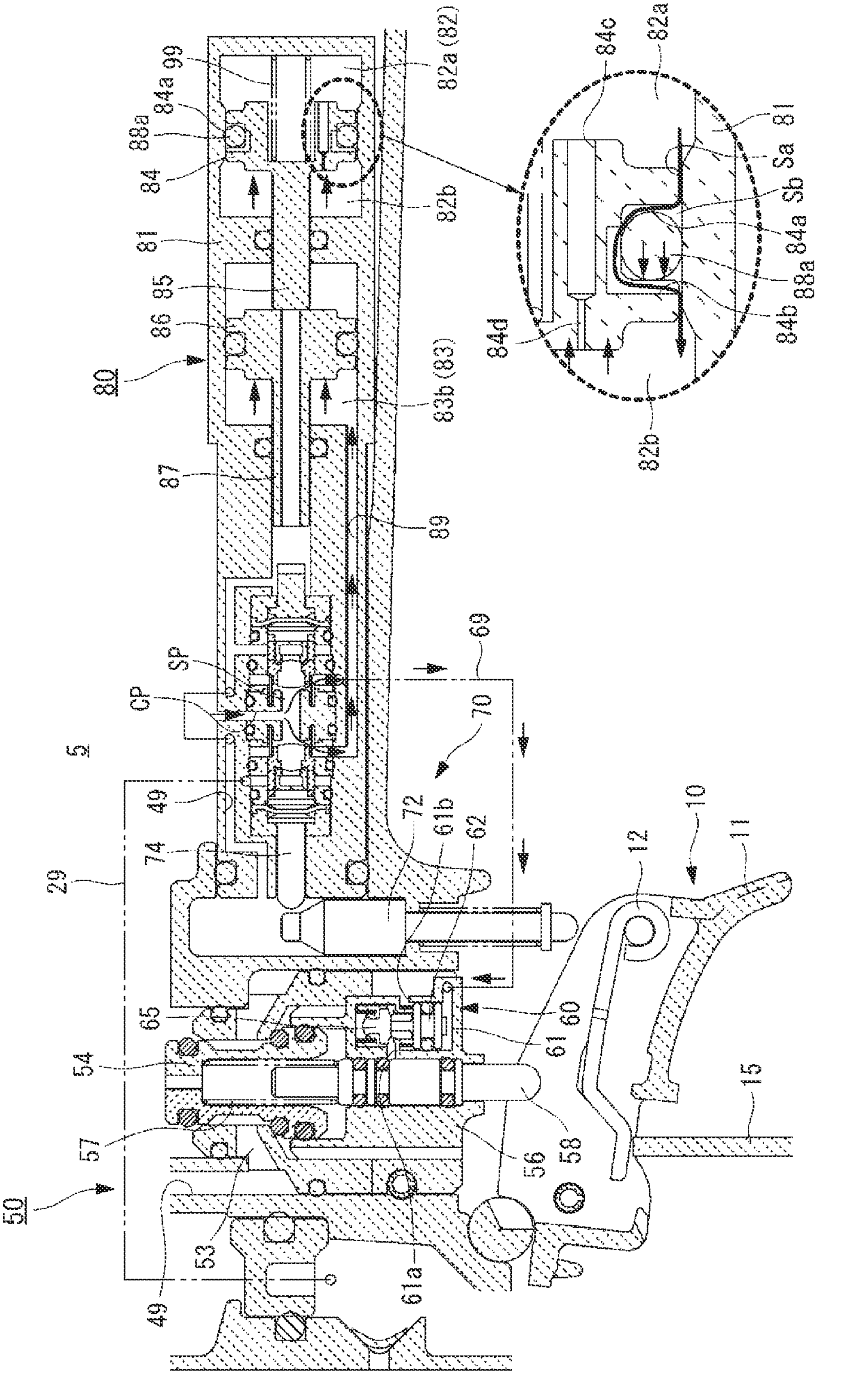
FIG. 5 is an enlarged view of main parts showing a striking operation in the nailing machine according to the first embodiment.

When an air hose (not shown) is connected to the air plug 8 of the nailing machine 100 shown in FIG. 1 and the compressed air is supplied into the main chamber 5 via the air hose or the like, the compressed air is caused to flow from the common passage CP into the empty chamber SP, as shown in FIG. 5. The inflow compressed air is supplied to the second space 83*b* of the second chamber 83 of the timer valve 80 via the sixth connection passage 89. Along with this, the front surface of the second timer piston 86 is pushed backward by the compressed air, and the first timer piston 84 and the like are retreated against the elastic force of the compression spring 99. That is, the timer valve 80 becomes in a timer setting state.

At this time, the atmospheric air in the first space 82*a* of the first chamber 82 of the timer valve 80 is compressed and the compressed atmospheric air is caused to flow from the first space 82*a* toward the second space 82*b*, so that the O-ring 88*a* is moved forward in the concave portion 84*a*. Thereby, a gap Sa between an outer peripheral surface of the first tinier piston 84 and the inner wall of the common cylinder 81, a gap Sb between the rear wall of the concave portion 84*a* and the O-ring 88*a* and the bypass passage 84*b* communicate one another, so that the atmospheric air in the first space 82*a* flows into the second space 82*b* via the gaps Sa and Sb and the bypass passage 84*b*. Note that, since the resistance of the throttle portion 84*d* becomes high, the atmospheric air hardly passes through the passage 84*c*.

In addition, the compressed air flowing into the empty chamber SP is supplied into the cylinder 61 of the second control valve 60 via the fourth connection passage 69. The control valve stem 62 and the seal member 65 of the second control valve 60 ascend by the compressed air supplied between the bottom surface in the cylinder 61 and the lower surface of the control valve stem 62, so that the second control valve 60 is actuated. Thereby, the first passage 61*a* is opened, so that the first passage 61*a* and the second passage 61*b* communicate with each other.

Note that, as shown in FIG. 2, the compressed air in the main chamber 5 is supplied to the empty chamber 55 of the trigger valve 50 via the passage 54*c*. In addition, the compressed air in the main chamber 5 is supplied to the head valve chamber 38 via the gap S1 and the passage 53.

Figure 6:
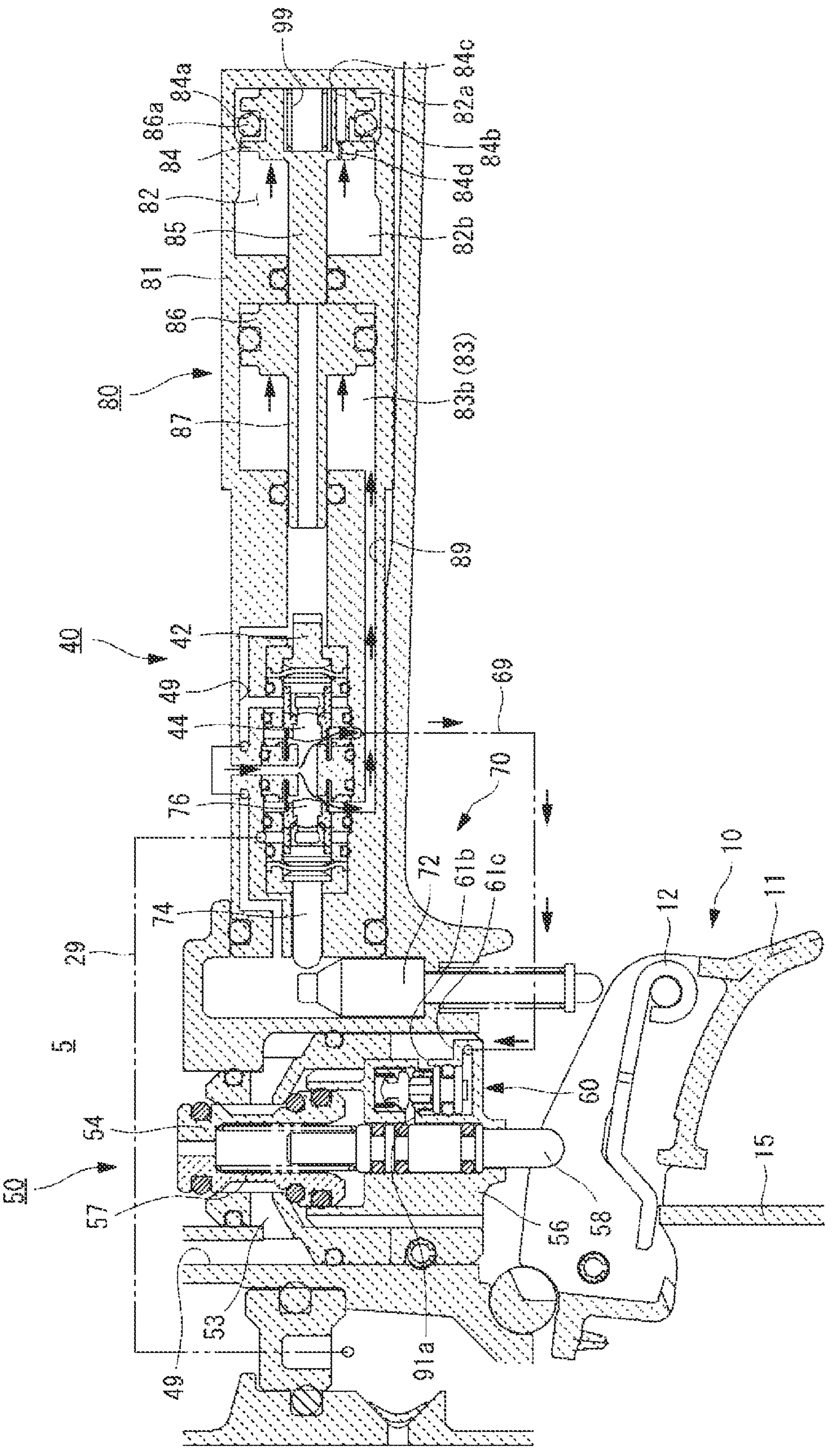
FIG. 6 is an enlarged view of main parts showing the striking operation in the nailing machine according to the first embodiment.

As shown in FIG. 6, when the supply of the compressed air into the second chamber 83 of the tinier valve 80 continues, the rear end face of the first timer piston 84 comes into contact with the rear wall in the first chamber 82. Thereby, the first timer piston 84 reaches the initial position in the common cylinder 81 and the timer valve 80 becomes in a standby state.

Figure 7:
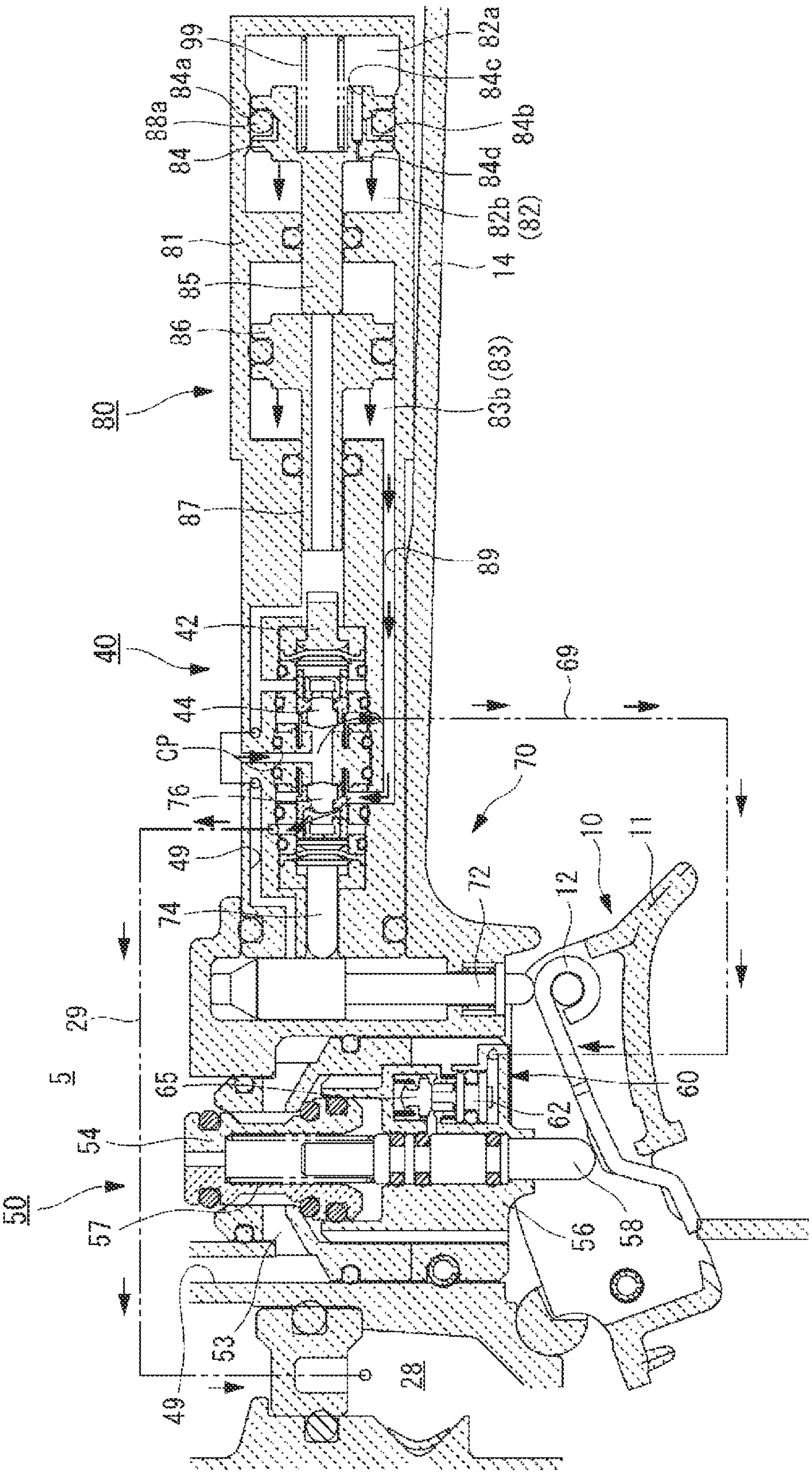
FIG. 7 is an enlarged view of main parts showing the striking operation in the nailing machine according to the first embodiment.

As shown in FIG. 7, when the trigger lever 11 is pulled by an operator, the switch valve stem 72 of the switch valve 70 is pushed up by the contact lever 12, so that the switch valve 70 is actuated, By the push-up of the switch valve stem 72, the pressing member 74 is pressed backward, and the seal member 76 is moved backward by the pressing member 74. Thereby, the sixth connection passage 89 is closed, so that the communication state between the connection passage CP and the sixth connection passage 89 is shut off. Note that, by the backward movement of the seal member 76, the sixth connection passage 89 and the first connection passage 29 communicate with each other. Along with this, the compressed air in the second space 83*b* of the second chamber 83 of the timer valve 80 is exhausted to the blow back chamber 28 at the atmospheric pressure via the sixth connection passage 89 and the first connection passage 29. As the compressed air in the timer valve 80 is exhausted, the first timer piston 84 and the second timer piston 86 are advanced toward the first control valve 40 by the urging force of the compression spring 99 and the time measurement (timer) by the timer valve 80 starts.

At this time, the atmospheric air in the second space 82*b* of the first chamber 82 of the timer valve 80 is compressed and flows into the first space 82*a* through the throttle portion 84*d* and the passage 84*c*. Since a flow rate of the atmospheric air flowing into the first space 82*a* is restricted to be constant by the throttle portion 84*d*, a flow rate of the atmospheric air flowing in the first space 82*a* is also reduced. For this reason, the first tinier piston 84 is slowly advanced based on the flow rate of the atmospheric air passing through the throttle portion 84*d* and the urging force of the compression spring 99. The prescribed time of the timer valve 80 becomes under time measurement.

Note that, in the concave portion 84*a* of the first timer piston 84, the O-ring 88*a* is moved backward in the concave portion 84*a* by the atmospheric air entering from the second space 82*b*, so that a passage between the O-ring 88*a* and the rear wall of the concave portion 84*a* is closed. For this reason, the atmospheric air in the second space 82*b* does not flow into the first space 82*a* via the concave portion 84*a*.

Figure 8A:
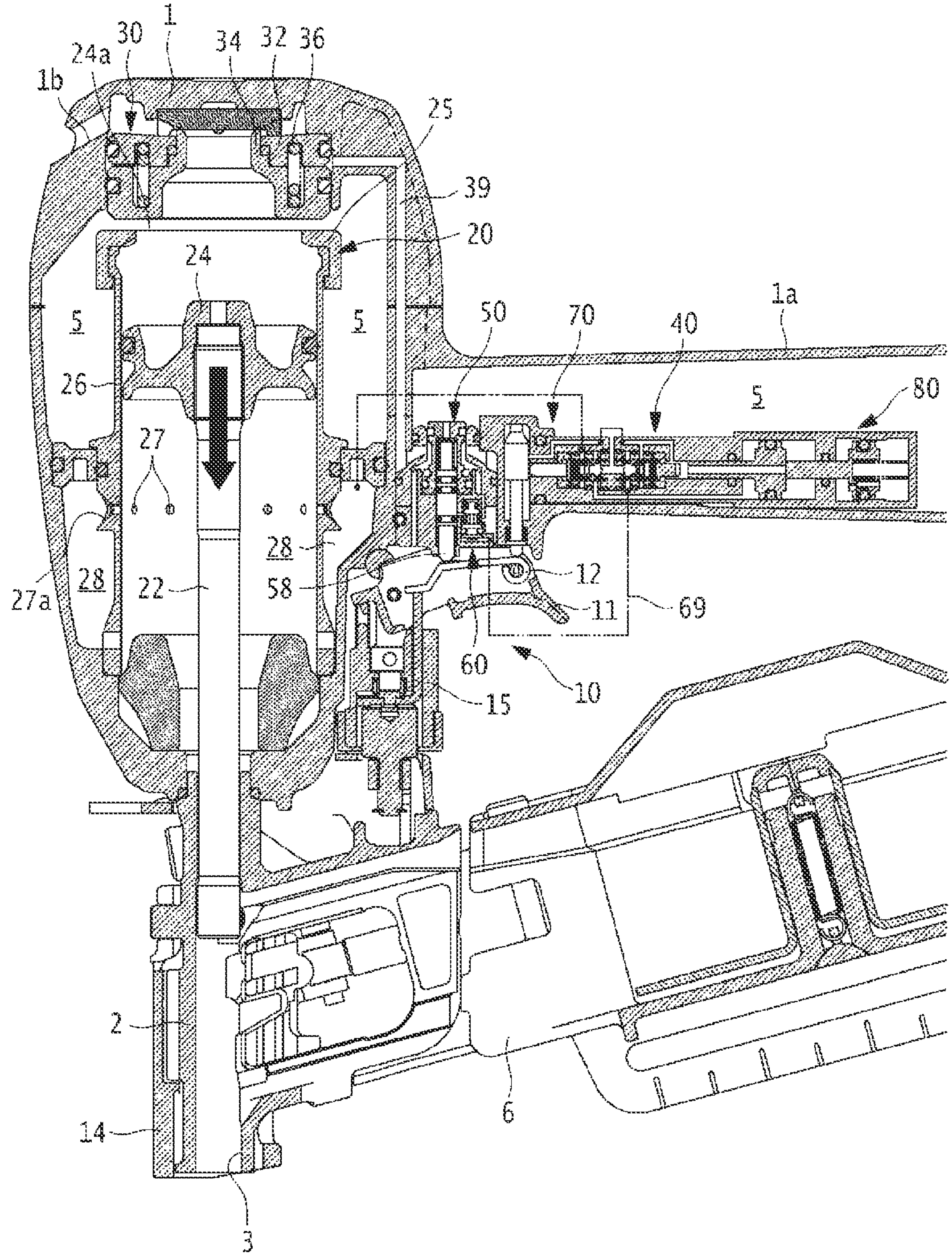
FIG. 8A is a view showing the striking operation in the nailing machine according to the first embodiment.
Figure 8B:
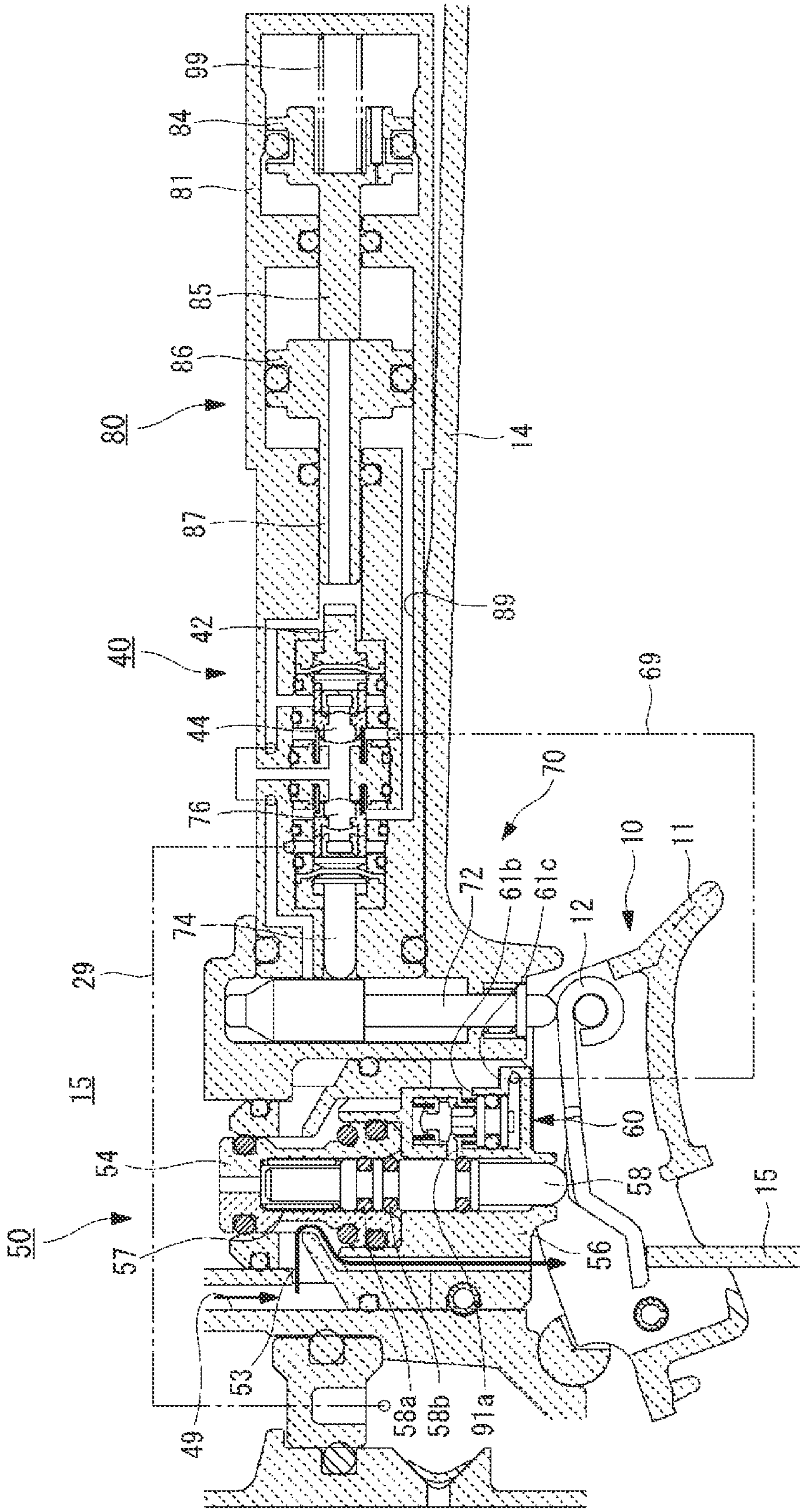
FIG. 8B is an enlarged view of main parts showing the striking operation in the nailing machine according to the first embodiment.

As shown in FIGS. 8A and 8B, when the contact arm 14 is pressed against the to-be-struck member in a state where the trigger lever 11 is pulled and before the prescribed time of the timer valve 80 elapses, the pressing member 15 is pushed up. Along with this, when the front end-side of the trigger lever 11 is pushed up, the trigger valve stem 58 of the trigger valve 50 is also pushed up by the trigger lever 11, so that the trigger valve 50 is actuated.

Figure 12A:
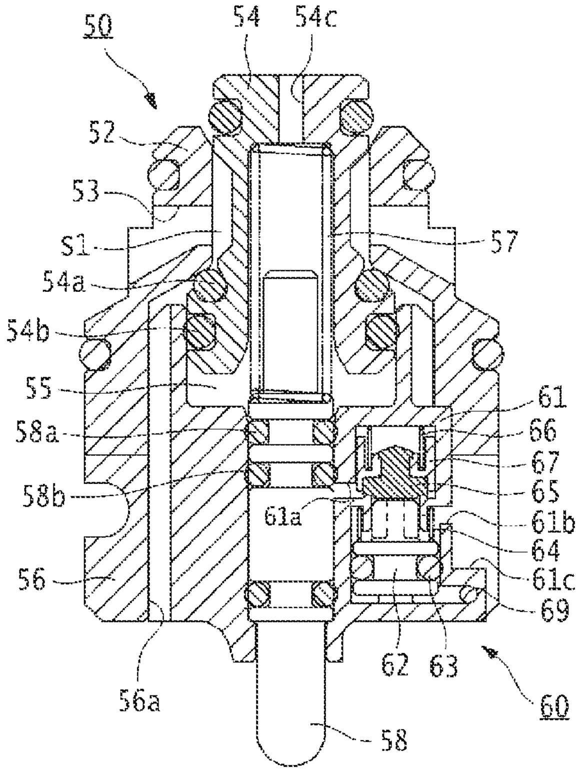
FIG. 12A is a view showing an operation of the trigger valve during the striking operation in the nailing machine according to the first embodiment.
Figure 12B:
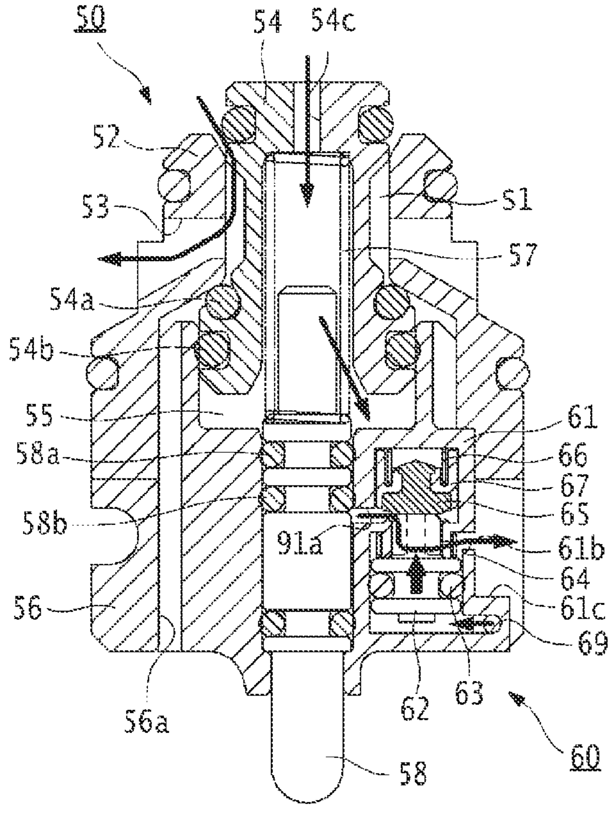
FIG. 12B is a view showing the operation of the trigger valve during the striking operation in the nailing machine according to the first embodiment.
Figure 12C:
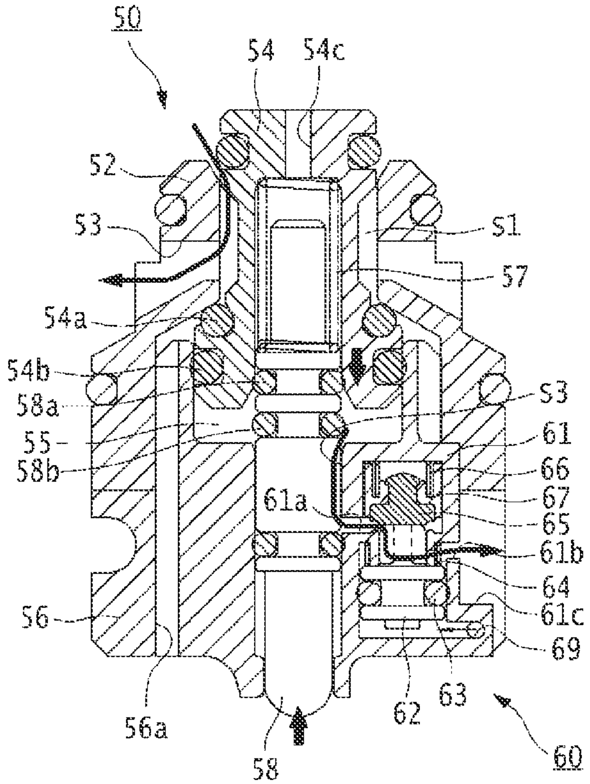
FIG. 12C is a view showing the operation of the trigger valve during the striking operation in the nailing machine according to the first embodiment.

As shown in FIG. 12C, when the trigger valve stem 58 is pushed up, the O-rings 58*a* and 58*b* are also moved upward, so that the compressed air in the empty chamber 55 passes through the first passage 61*a* of the second control valve 60 from the gap S3 between the trigger valve stem 58 and the outer wall surface of the cylinder 61. The compressed air passing through the first passage 61*a* passes through the inside of the cylinder 61 and is exhausted to the outside via the second passage 61*b* and the air exhaust passage 61*d*.

Figure 12D:
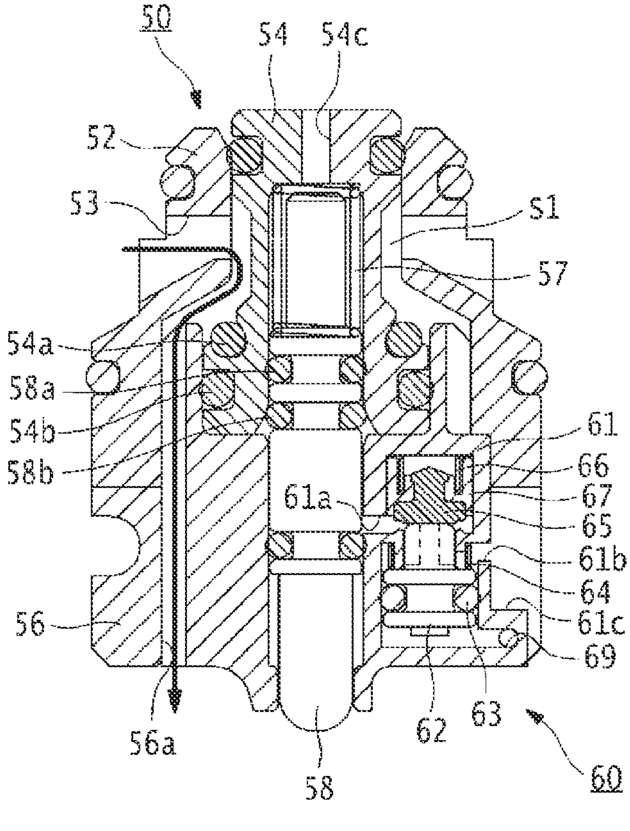
FIG. 12D is a view showing the operation of the trigger valve during the striking operation in the nailing machine according to the first embodiment.

Along with this, as shown in FIGS. 8A and 12D, the pilot valve 54 is pushed down against the elastic force of the compression spring 57 by the compressed air in the main chamber 5, so that the lower surface of the pilot valve 54 comes into contact with the upper surface of the cap 56. Thereby, the passage 53 and the air exhaust passage 56*a* communicate with each other, and the compressed air in the head valve chamber 38 is exhausted to the atmosphere (outside) via the second connection passage 39, the inside of the trigger valve 50 and the air exhaust passage 56*a*.

When the compressed air in the head valve chamber 38 is exhausted, as shown in FIG. 8A, the movable part 34 of the head valve 30 is pushed up by the compressed air in the main chamber 5 and the movable part 34 and the locking part 25 are opened therebetween, so that the compressed air is caused to flow from the main chamber 5 into the piston upper chamber 24*a* and the piston 24 rapidly descends in the cylinder 26.

Figure 9A:
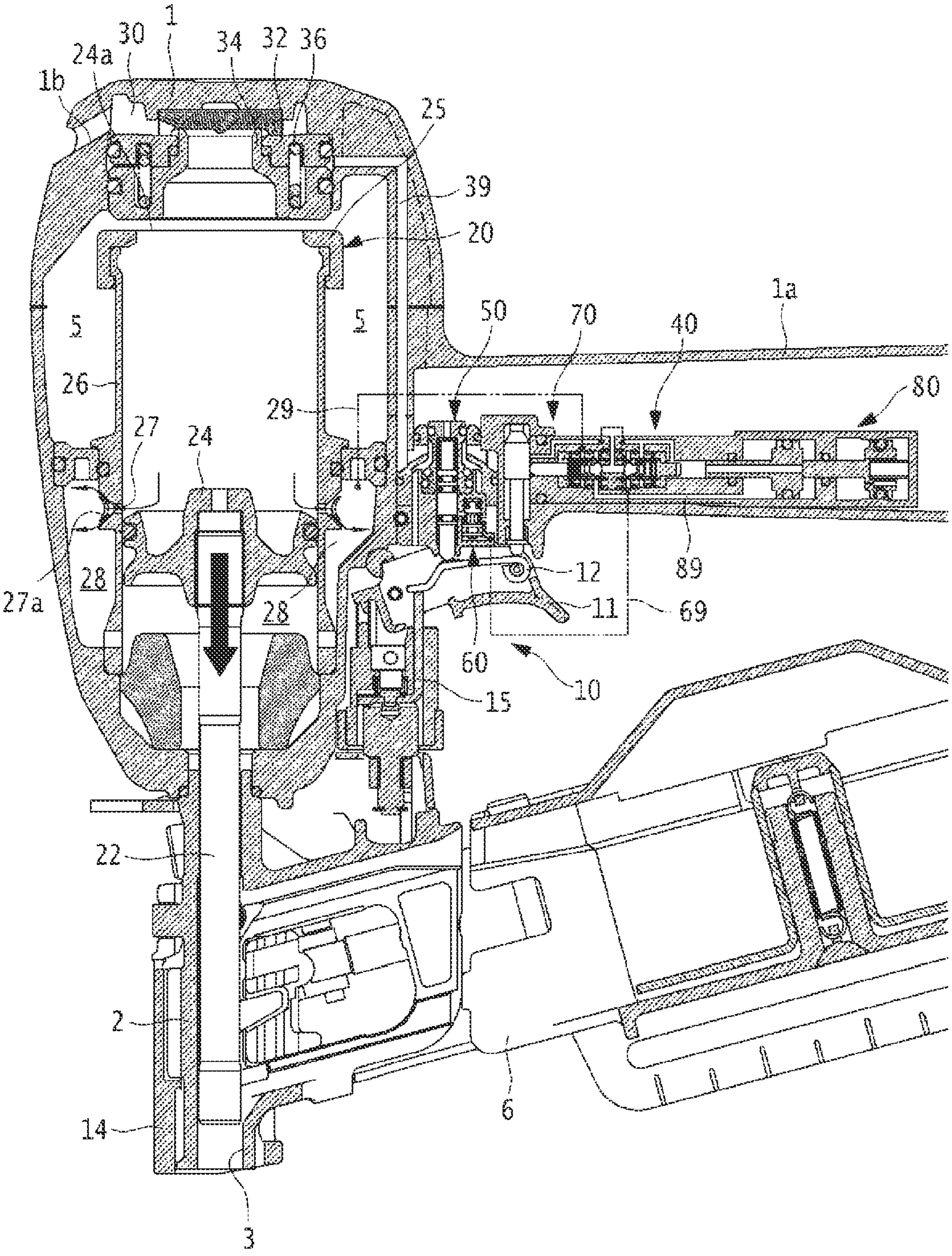
FIG. 9A is a view showing the striking operation in the nailing machine according to the first embodiment.
Figure 9B:
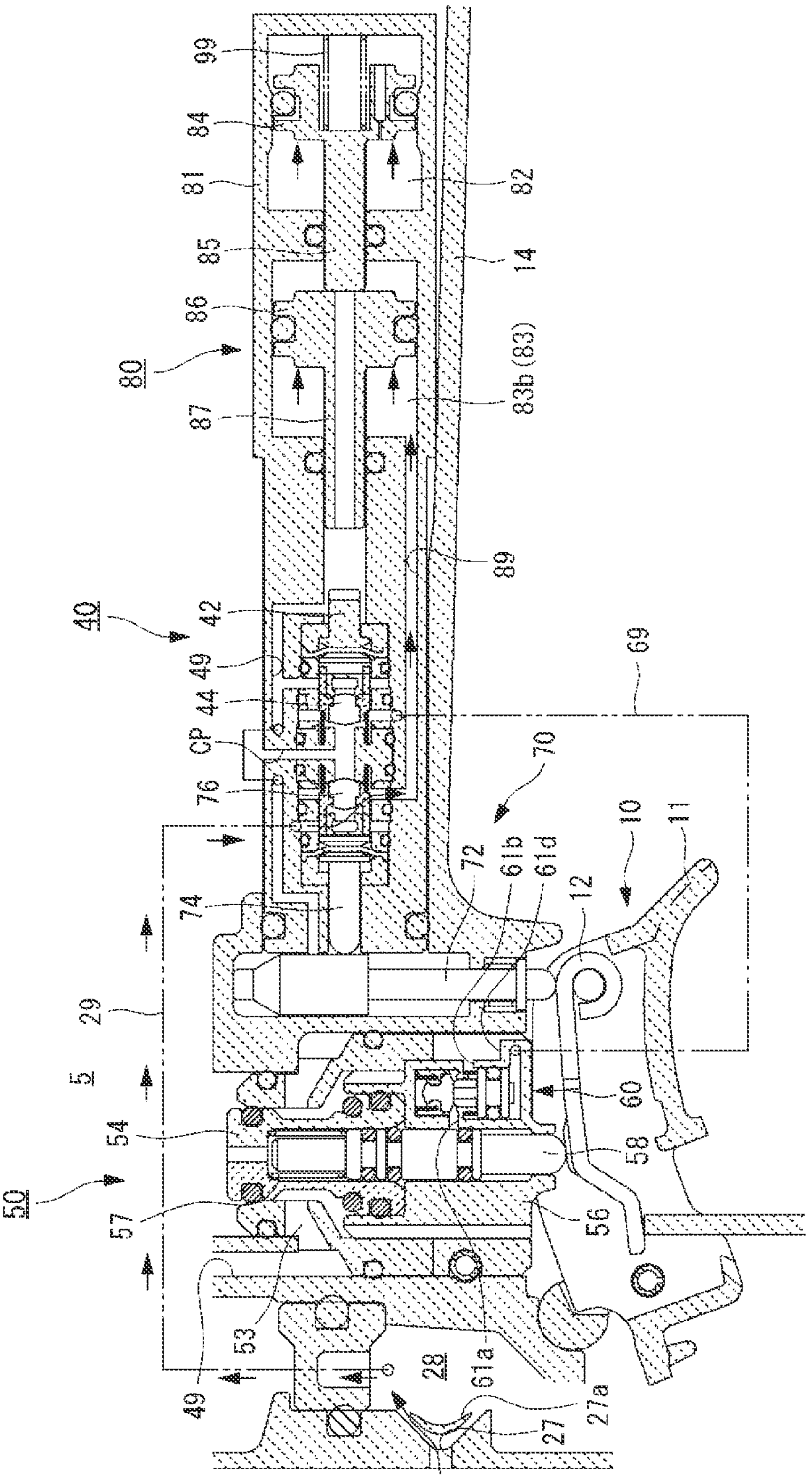
FIG. 9B is an enlarged view of main parts showing the striking operation in the nailing machine according to the first embodiment.

As shown in FIG. 9A, when the piston 24 further descends, the nail is struck into the to-be-struck member by the driver 22 connected to the piston 24. In addition, when the piston 24 descends to the lower part-side in the cylinder 26, the compressed air in the cylinder 26 is caused to flow into the blow back chamber 28 via the small holes 27. As shown in FIG. 9B, the inflow compressed air is caused to flow into the switch valve 70 under actuation via the first connection passage 29, and is also caused to flow into the second space 83*b* of the second chamber 83 of the timer valve 80 via the sixth connection passage 89. Thereby, the first timer piston 84 and the first piston shaft part 85 of the timer valve 80 are again retreated in the common cylinder 81, so that the timer valve 80 is reset.

Figure 10:
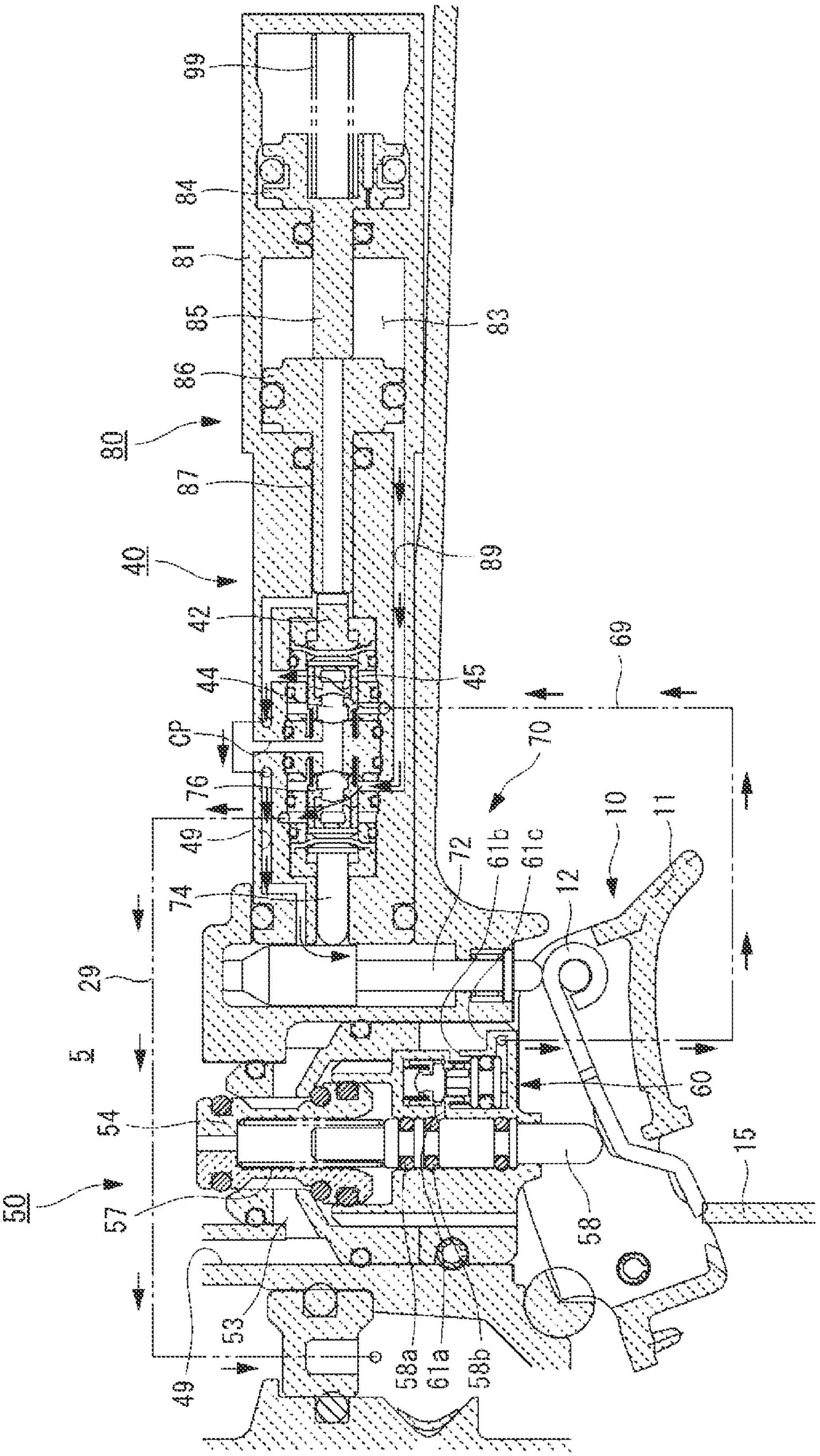
FIG. 10 is an enlarged view of main parts showing the striking operation in the nailing machine according to the first embodiment.

As shown in FIG. 10, when the contact arm 14 is not pressed against the to-be-struck member within the prescribed time from the time point when the trigger lever 11 shown in FIG. 7 is pulled (the timer valve 80 is actuated), the second timer piston 86 of the timer valve 80 is moved to the actuation position in which the first control valve 40 can be pressed when the prescribed time elapses, and is further moved to the front end portion of the second chamber 83. At this time, the compressed air in the second chamber 83 of the timer valve 80 is exhausted into the blow back chamber 28 via the sixth connection passage 89, the inside of the switch valve 70 and the first connection passage 29.

The pressing member 42 of the first control valve 40 is pressed from the rear side by the second piston shaft part 87. The pressing member 42 is advanced in the common cylinder 81 to press the seal member 44 via the attachment member 45, thereby moving forward the seal member 44. When the seal member 44 is moved forward, while the communication state between the fourth connection passage 69 and the common passage CP is shut off, the fourth connection passage 69 and the third connection passage 49 communicate with each other. Along with this, in the state shown in FIG. 12B, the compressed air between the lower surface of the control valve stem 62 of the second control valve 60 and the bottom surface in the cylinder 61 is exhausted from the blow back chamber 28 to the outside via the fourth connection passage 69, the inside of the first control valve 40 and the third connection passage 49. Thereby, as shown in FIG. 12A, the control valve stem 62 of the second control valve 60 and the seal member 65 descend, so that the first passage 61*a* is closed by the seal member 65 and the communication between the first passage 61*a* and the second passage 61*b* is shut off.

Figure 11:
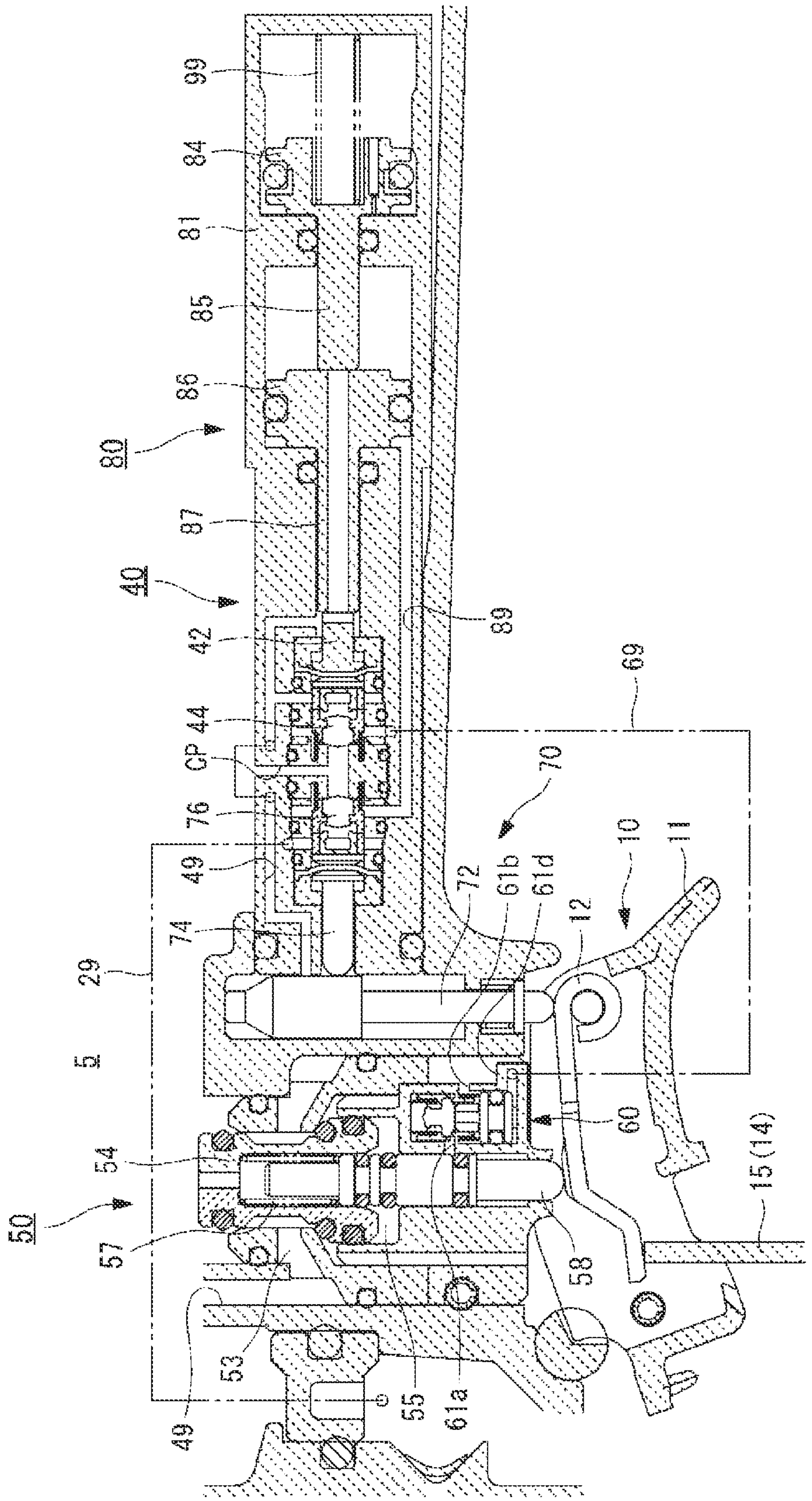
FIG. 11 is an enlarged view of main parts showing the striking operation in the nailing machine according to the first embodiment.
Figure 12E:
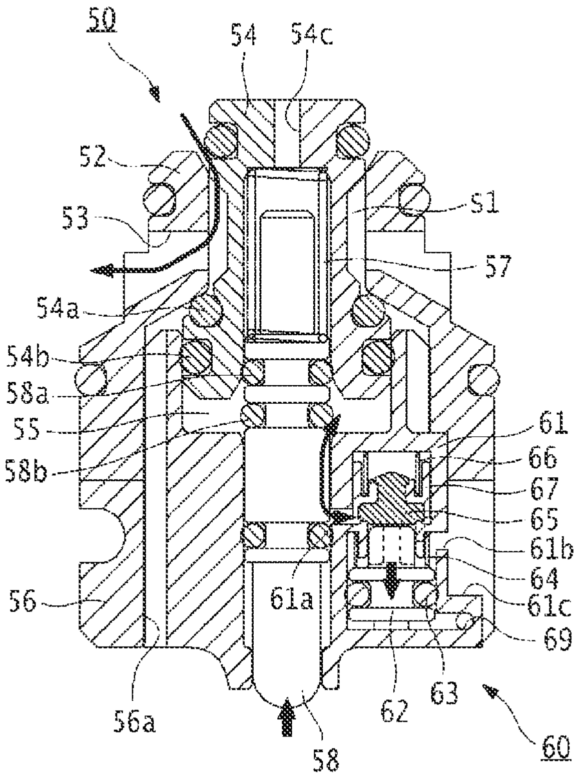
FIG. 12E is a view showing the operation of the trigger valve during the striking operation in the nailing machine according to the first embodiment.

As shown in FIG. 11, when the contact arm 14 is pressed against the to-be-struck member after the prescribed time of the timer valve 80 elapses in a state where the trigger lever 11 shown in FIG. 7 is pulled, the pressing member 15 is accordingly pushed up. Along with this, when the front end-side of the contact lever 12 is pushed up, the trigger valve stem 58 of the trigger valve 50 is pushed up, so that the trigger valve 50 is actuated. As shown in FIG. 12E, when the trigger valve stem 58 is pushed up, the O-rings 58*a* and 58*b* are also moved upward. However, since the first passage 61*a* of the second control valve 60 is closed by the seal member 65, the compressed air in the empty chamber 55 remains as it is, without being exhausted to the outside. That is, the filled state of the compressed air in the empty chamber 55 is maintained. In addition, the empty chamber 55 and the air exhaust passage 56*a* are isolated from each other by the O-ring 54*a*. Therefore, the compressed air in the head valve chamber 38 is not exhausted to the outside via the air exhaust passage 56*a*. For this reason, even when the contact arm 14 is pressed against the to-be-struck member in a state where the operator pulls the trigger lever 11, the head valve 30 is not actuated, so that the striking operation is not executed.

As described above, according to the first embodiment, the filling or exhaust of the compressed air with respect to the empty chamber 55 of the trigger valve 50 is controlled by the second control valve 60. Thereby, since the volume of the empty chamber 55 of the trigger valve 50 is smaller than the volume of the head valve chamber 38 of the head valve 30 and the flow rate of the compressed air caused to flow in and flow out is smaller in the empty chamber 55 of the trigger valve 50 than in the head valve chamber 38 of the head valve 30, the second control valve 60 can be made small. As a result, the second control valve 60 is made small, so that the nailing machine 100 can be made small. In addition, the second control valve 60 is made small, so that responsiveness of the actuation of the second control valve 60 can also be improved.

Second Embodiment

In the structure of the timer mechanism of the nailing machine of the related art disclosed in PTL 1, it is configured in many cases so that a constant resistance is applied to maintain the moving speed of the timer valve constant and the switching valve is actuated after a preset prescribed time elapses. For this reason, at a stage of actuating the switching valve, a load (pressing force) of the timer valve becomes insufficient, so that the switching valve cannot be controlled in a stable state. Therefore, in order to solve the above problems, a configuration of a nailing machine 200 according to a second embodiment is adopted.

In a timer valve 280 according to the second embodiment, a configuration different from the timer valve 80 of the first embodiment is adopted. Similarly, also for a switch valve 270 and a control valve 240 of the second embodiment, configurations different from the switch valve 70 and the second control valve 60 and the like of the first embodiment are adopted. Note that, since the other configuration, function and operation of the nailing machine 200 are common to the configuration and the like of the nailing machine 100 of the first embodiment, the detailed descriptions thereof are omitted. In addition, since the trigger valve 50 of the second embodiment is substantially common to the trigger valve 50 of the first embodiment in terms of the configuration and the like, except that the control valve is not arranged in the trigger valve 50, the detailed descriptions thereof are omitted.

[Configuration Example of Nailing Machine 200]

Figure 13:
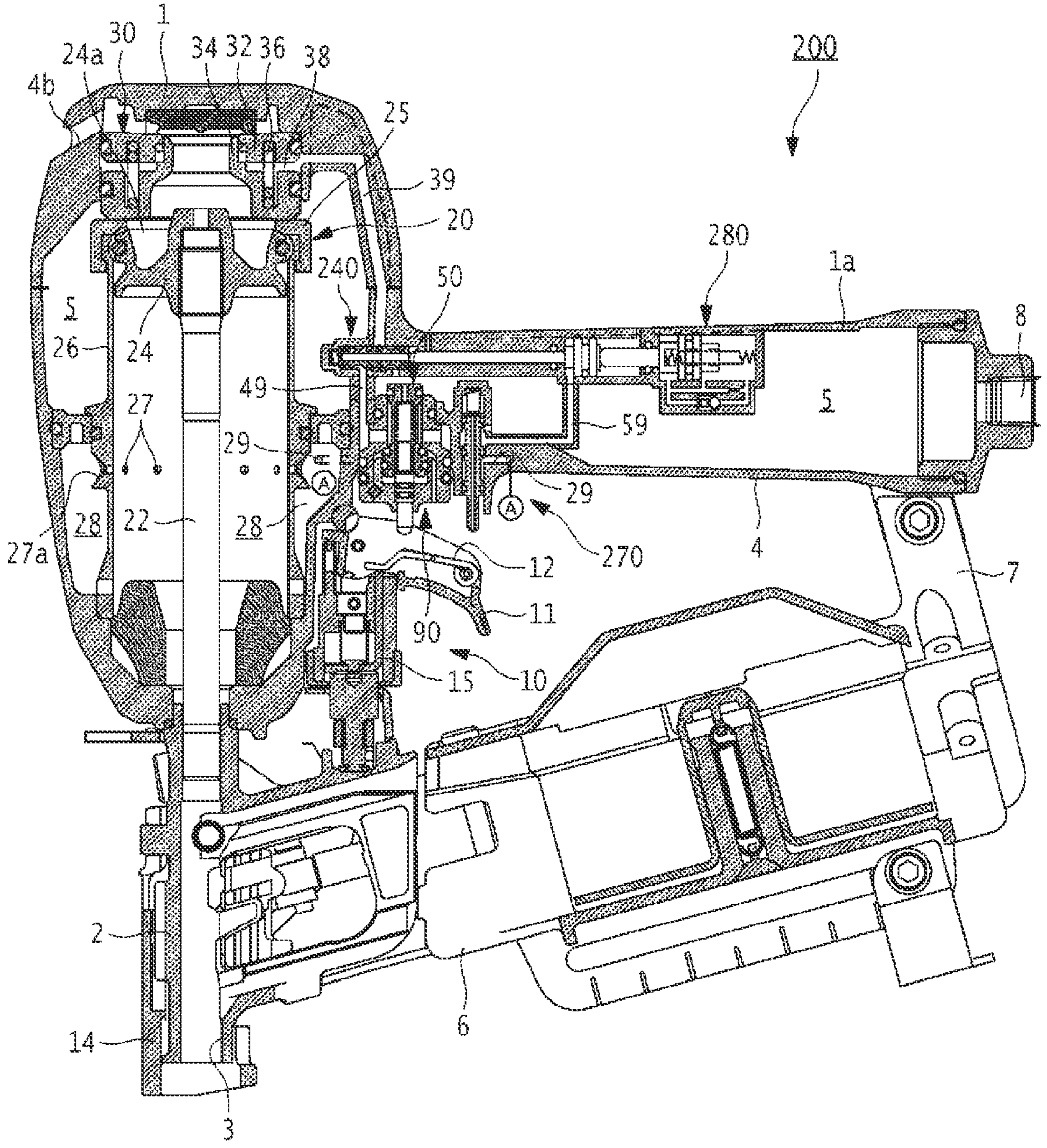
FIG. 13 is a side sectional view of a nailing machine according to a second embodiment.
Figure 14:
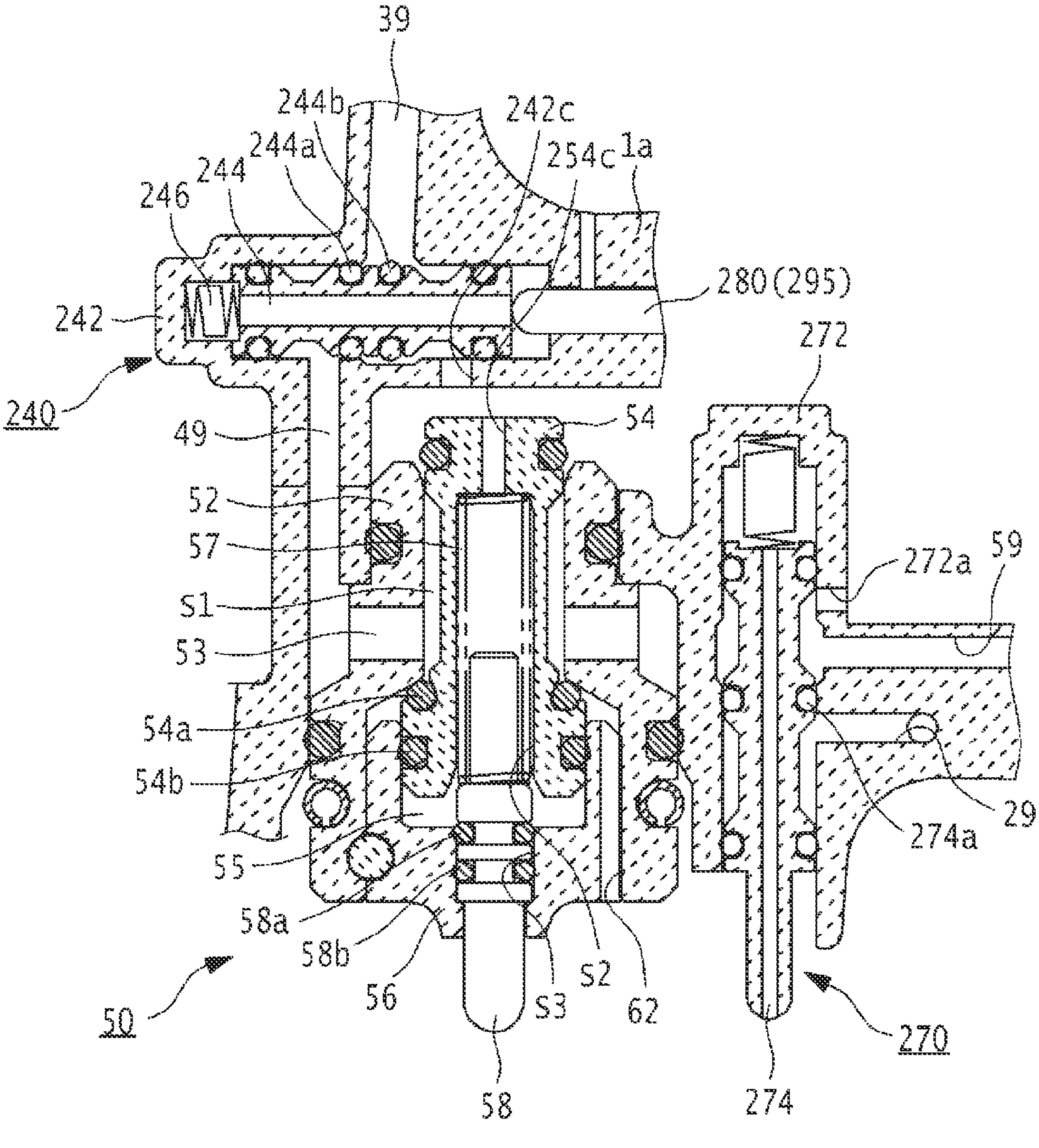
FIG. 14 is a side sectional view of a trigger valve, a switch valve and a control valve according to the second embodiment.
Figure 15A:
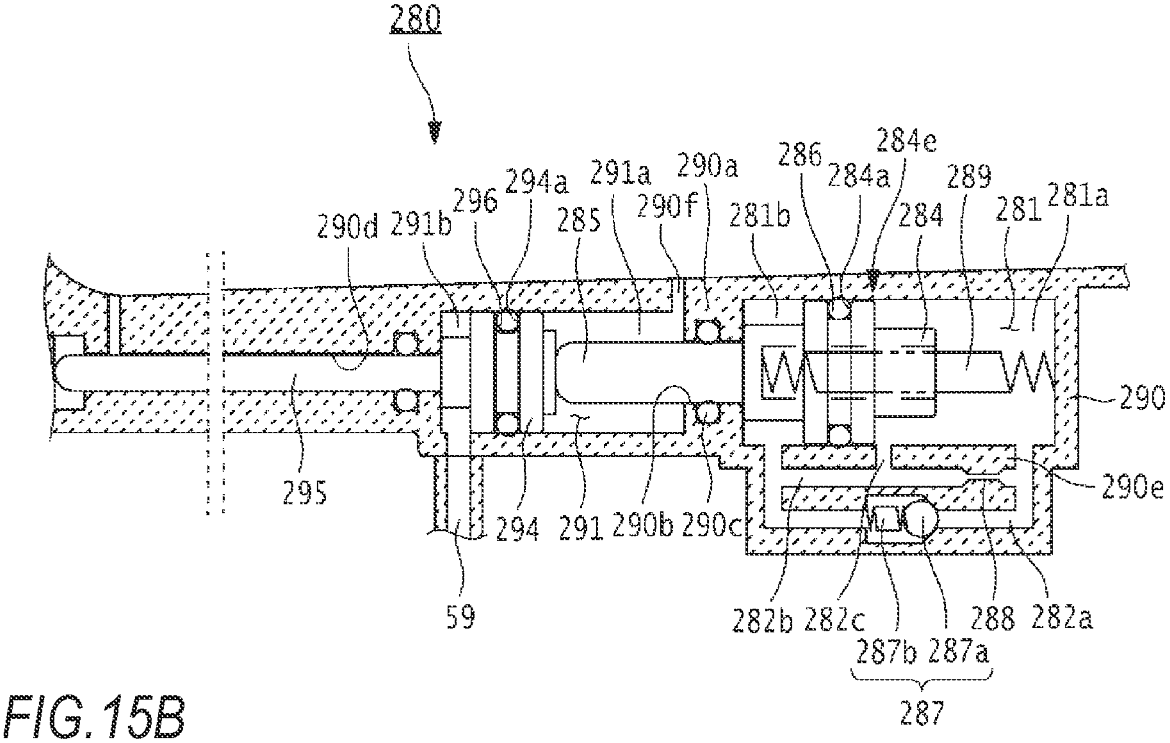
FIG. 15A is a side sectional view of a timer valve according to the second embodiment.
Figure 15B:
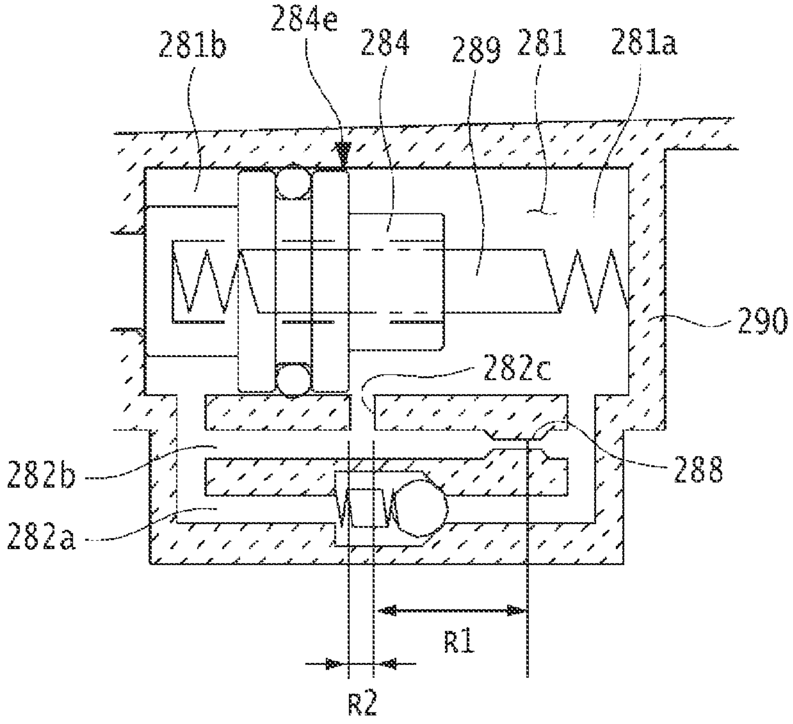
FIG. 15B is a view for illustrating a first section and a second section of the timer valve according to the second embodiment.

FIG. 13 is a side sectional view of a nailing machine 200 according to a second embodiment. FIG. 14 is a side sectional view of a trigger valve 50, a switch valve 270 and a control valve 240 according to the seventh embodiment. FIG. 15A is a side sectional view of a timer valve 280 according to the second embodiment, and FIG. 15B is a view for illustrating a first section R1 and a second section R2.

As shown in FIG. 13 and the like, the nailing machine 200 includes the piston 24 capable of sliding in the cylinder 26, the striking mechanism 20 having the driver 22 attached to the piston 24 and configured to strike a nail into a to-be-struck member, the head valve chamber 38 to which compressed air for driving the striking mechanism 20 is supplied, the head valve 30 configured to drive the striking mechanism 20 by using the compressed air supplied to the head valve chamber 38, the trigger valve 50 configured to actuate the head valve 30, a control valve 240 configured to disable actuation of the head valve 30 configured to be actuated in conjunction with actuation of the trigger valve 50, a timer valve 280 configured to disable actuation of the head valve 30 after a predetermined time elapses by actuating the control valve 240, and a switch valve 270 configured to actuate the timer valve 280 based on an operation on the trigger lever 11.

As shown in FIGS. 13 and 14, the switch valve 270 is arranged in the vicinity of a rear side of the trigger valve 50, and is configured to actuate the timer valve 280 based on an operation on the trigger lever 11. The switch valve 270 has a cylinder 272 and a switch valve stem 274.

The cylinder 272 is a hollow cylindrical body extending in the upper and lower direction, and is configured to accommodate the switch valve stem 274 so as to be slidable in the upper and lower direction. An upper side of the cylinder 272 is formed with a passage 272*a*. The passage 272*a* is configured to communicate with the main chamber 5, and the compressed air in the main chamber 5 is caused to flow into the cylinder 272 via the passage 272*a*.

One end portion of a fifth connection passage 59 is configured to communicate in a substantially intermediate position in the upper and lower direction of the cylinder 272, and the other end portion of the fifth connection passage 59 is configured to communicate with the timer valve 280. The fifth connection passage 59 is configured to connect the switch valve 270 and the tinier valve 280 each other, and the compressed air can be supplied or exhausted with respect to the timer valve 280 via the fifth connection passage 59. One end portion of the first connection passage 29 is configured to communicate on a further lower side than the fifth connection passage 59 of the cylinder 272, and the other end portion of the first connection passage 29 is configured to communicate with the blow back chamber 28. The first connection passage 29 is configured to connect the switch valve 270 and the blow back chamber 28 therebetween, so that the compressed air can be supplied to the switch valve 270 or the compressed air can be exhausted from the switch valve 270 via the first connection passage 29.

The switch valve stem 274 is accommodated in the cylinder 272, and is urged toward the trigger lever 11 (toward the lower side) by a compression spring 276. The compression spring 276 is interposed between an upper end face of the switch valve stem 274 and a top surface in the cylinder 272, and is adapted to expand and contract, in response to a pulling operation on the trigger lever 11. A lower end portion of the switch valve stem 274 protrudes downward from the lower surface of the cylinder 272, and comes into contact with the contact lever 12 at the time when the trigger lever 11 is pulled.

An O-ring 274*a* is mounted to a peripheral edge portion of a substantially intermediate position in the upper and lower direction of the switch valve stem 274. During non-pulling operation of the trigger lever 11, the switch valve stem 274 is configured to close a path between the fifth connection passage 59 and the first connection passage 29 by the O-ring 274*a* and to communicate the passage 272*a* and the fifth connection passage 59 each other. On the other hand, during a pulling operation of the trigger lever 11, the switch valve stem 274 is configured to be pushed up against an elastic force of the compression spring 276 by the contact lever 12, and to close a path between the passage 272*a* and the fifth connection passage 59 by the O-ring 274*a* and to communicate the fifth connection passage 59 and the first connection passage 29 each other.

As shown in FIGS. 13 and 14, the control valve 240 is configured to communicate or shut off a path between the head valve chamber 38 and the trigger valve 50 by control of the timer valve 280. The control valve 240 is arranged in a position near the front side of the tinier valve 280, between the head valve chamber 38 and the trigger valve 50. The control valve 240 has a cylinder 242 and a control valve stem 244. Note that, a part of the cylinder 242 has a structure sharing a part of the housing 1*a*.

The cylinder 242 is a hollow cylindrical body extending in the front and rear direction, and is configured to accommodate the control valve stem 244 so as to be slidable in the front and rear direction. An upper surface-side of the cylinder 242 is configured to communicate with one end portion of the second connection passage 39 configured to communicate with the head valve chamber 38. A lower surface-side of the cylinder 242 is configured to communicate with one end portion of the third connection passage 49 configured to communicate with the trigger valve 50, and is formed with a passage 242*c* configured to communicate with the main chamber 5.

The control valve stem 244 is a columnar body extending in the front and rear direction and is arranged in the cylinder 242. The control valve stem 244 is urged toward the tinier valve 280 (toward the rear side) by a compression spring 246. The compression spring 246 is interposed between a front wall in the cylinder 242 and a front end face of the control valve stem 244, and is adapted to expand and contract, in response to pressing by the timer valve 280. O-rings 244*a* and 244*b* for close contact with the inner wall of the cylinder 242 are attached at a predetermined interval in the front and rear direction to a peripheral edge portion of a substantially intermediate position in the front and rear direction of the control valve stein 244.

The control valve stem 244 is located on a rear end-side in the cylinder 242 and closes a path between the second connection passage 39 and the passage 242*c* by the O-ring 244*b*, and opens a path between the second connection passage 39 and the third connection passage 49, upon non-pressing of the timer valve 280, i.e., before timeout. Thereby, the head valve chamber 38 and the trigger valve 50 are connected to each other. On the other hand, the control valve stein 244 is moved to a front end-side in the cylinder 242, and opens the path between the second connection passage 39 and the passage 242*c* and closes the path between the second connection passage 39 and the third connection passage 49 by the O-ring 244*a*, upon pressing of the timer valve 280, i.e., after timeout, Thereby, the head valve chamber 38 and the trigger valve 50 are shut off therebetween.

As shown in FIGS. 13, 15A and 15B, in a state where the trigger lever 11 is pulled, after a preset prescribed time elapses, when the contact arm 14 is pressed against the to-be-struck member, the timer valve 280 actuates the control valve 240 to disable the striking operation.

The timer valve 280 has a cylinder 290, a first timer piston 284, a first piston shaft part 285, a second tinier piston 294, and a second piston shaft part 295.

The second cylinder 290 is a hollow cylindrical body extending in the front and rear direction, and is configured to accommodate the first timer piston 284 and the second timer piston 294 so as to be slidable in the front and rear direction. An inside of the cylinder 290 is partitioned into a first chamber 281 and a second chamber 291, which are an example of the accommodation part, via a partition portion 290*a*. The first chamber 281 is constituted by a sealed closed space (closed circuit) and is isolated from the second chamber 291, which is another space, the main chamber 5 and the like. In the first chamber 281, the atmospheric air (air) that is used when actuating the timer valve 280 is filled in advance. Thereby, it is possible to prevent impurities such as trash and oil from flowing into the first chamber 281 from other spaces.

The first timer piston 284 is a cylindrical body having substantially the same diameter as an inner diameter of the cylinder 290, and is configured to slide along an inner wall of the cylinder 290. The first timer piston 284 is urged toward the control valve 240 (toward the front side) by a compression spring 289. The compression spring 289 is interposed between a concave portion formed on a base end-side of the first timer piston 284 and a rear wall in the first chamber 281, and is adapted to expand and contract, according to advance or retreat of the first timer piston 284. The first timer piston 284 can move to the actuation position in which the control valve 240 is pressed when the time measurement by the timer valve 280 elapses for a predetermined time.

A peripheral edge portion of the first timer piston 284 is formed with a concave portion 284*a* along a circumferential direction thereof. In the concave portion 284*a*, an O-ring 286 for sealing between the concave portion and the inner wall of the cylinder 290 is mounted. Thereby, the first chamber 281 is further partitioned into a first space 281*a* on a rear side of the O-ring 286 and a second space 281*b* on a front side of the O-ring 286. The first space 281*a* and the second space 281*b* are shut off from each other by the O-ring 286.

On a lower side in the cylinder 290, a first passage 282*a* and a second passage 282*b* extending in the front and rear direction are provided side by side in the upper and lower direction. A front end portion of the first passage 282*a* is configured to communicate with the second space 281*b*, and a rear end portion of the first passage 282*a* is configured to communicate with the first space 281*a*. A front end portion of the second passage 282*b* is configured to communicate with the second space 281*b*, and a rear end portion of the second passage 282*b* is configured to communicate with the first space 281*a*.

A check valve 287 is provided in the middle of the path of the first passage 282*a*. The check valve 287 has a ball 287*a* for opening/closing the first passage 282*a*, for example, and a spring 287*b* for urging backward the ball 287*a*. When the first tinier piston 284 is retreated in the first chamber 281, the ball 287*a* is moved forward against an elastic force of the spring 287*b* by the atmospheric air flowing into the first passage 282*a* from the first space 281*a*, so that the first passage 282*a* opens and the atmospheric air in the first space 281*a* of the first chamber 281 is caused to flow into the second space 281*b*. When the first timer piston 284 is advanced in the first chamber 281, the atmospheric air flowing into the first passage 282*a* from the second space 281*b* and the spring 287*b* act on the ball 287*a* and the first passage 282*a* is closed by the ball 287*a*, so that the atmospheric air in the second space 281*b* of the cylinder 290 does not flow into (flow back to) the first space 281*a* via the first passage 282*a*.

A throttle portion 288 that is an example of the compression generation part is provided in the middle of the path of the second passage 282*b*. The throttle portion 288 is constituted by reducing a cross-sectional area (narrowing a width) of a path of a part of the second passage 282*b*. The throttle portion 288 is configured to restrict a flow rate per unit time of the atmospheric air, which is caused to flow into the second passage 282*b* from the second space 281*b*, to be constant, thereby generating the compressed air for moving the first timer piston 284 and the like. Thereby, it is possible to control the moving speed until the second piston shaft part 295 presses the control valve stem 244 of the control valve 240. In addition, a prescribed time at the time when the first timer piston 284 moves from an initial position in the first chamber 281 to an actuation position in which the control valve 240 is actuated is determined by a flow rate passing through the throttle portion 288 of the timer valve 280, a spring coefficient of the compression spring 289, and the like. In the present embodiment, the prescribed time is, for example, 3 seconds to 10 seconds. However, the present invention is not limited thereto. In addition, in the present embodiment, a time for which the control valve 240 moves from the actuation position to a position in which the passage, between the head valve chamber 38 and the trigger valve 50 is shut off is set to a time considerably shorter than the prescribed time. For this reason, when the prescribed time elapses, the passage between the head valve 30 and the trigger valve 50 is immediately shut off by the control valve 240.

As shown in FIG. 15A, a bypass passage 282*c* penetrating a partition wall 290*e* constituting the cylinder 290 in a thickness direction (upper and lower direction) is formed between a substantially intermediate position of the second passage 282*b* and the cylinder 290 in a position in which the first timer piston 284 is accommodated. The bypass passage 282*c* is a passage different from the second passage 282*b* for causing the atmospheric air to flow from the second space 281*b* into the first space 281*a* of the cylinder 290.

As shown in FIG. 15B, a moving range of the first timer piston 284 includes a first section R1 for measuring a prescribed time after the trigger lever 11 is pulled until the control valve 240 is actuated, and a second section R2 for pressing the control valve 240. In the present embodiment, based on a rear end portion 284*e* of the first timer piston 284 configured to move in the cylinder 290, the first section R1 is a section between the initial position of the first timer piston 284 and a rear edge of the bypass passage 282*c*. In addition, the second section R2 is a section between the rear edge of the bypass passage 282*c* and the actuation position in which the control valve 240 is pressed.

In the present embodiment, a resistance (second resistance) to the first timer piston 284 in the second section R2 is configured smaller than a resistance (first resistance) to the first timer piston 284 in the first section R1. Specifically, in the first section R1, a passage through which the atmospheric air passes from the second space 281*b* to the first space 281*a* becomes the throttle portion 288 of the second passage 282*b*. In the second section R2, a passage through which the atmospheric air passes from the second space 281*b* to the first space 281*a* becomes the bypass passage 282*c* whose cross-sectional area is greater and flow resistance is smaller than the throttle portion 288.

Back to FIG. 15A, the first piston shaft part 285 is a rod-shaped columnar body, and a rear end portion of the first piston shaft part 285 is attached to a front end portion of the first timer piston 284. The first piston shaft part 285 is inserted in a through-hole 290*b* formed in the partition portion 290*a*, and a front end-side thereof extends from the inside of the first chamber 281 into the second chamber 291. A front end portion of the first piston shall part 285 is attached to a rear end portion of the second tinier piston 294 and is configured to be able to transmit the pressing force of the first timer piston 284 to the second timer piston 294. An O-ring 290*c* is attached to the partition portion 290*a* to secure a sealed state of the first chamber 281.

The second timer piston 294 is a cylindrical body having substantially the same diameter as an inner diameter of the cylinder 290, and is configured to be advanced and retreated in the second cylinder 291, according to the pressing by the first piston shaft part 285. A peripheral edge portion of the second timer piston 294 is formed with a concave portion 294*a* along a circumferential direction thereof. In the concave portion 294*a*, an O-ring 296 for sealing between the concave portion and the inner wall of the cylinder 290 is mounted. Thereby, the second chamber 291 is further partitioned into a first space 291*a* on a rear side of the O-ring 296 and a second space 291*b* on a front side of the O-ring 296.

The first space 291*a* is formed with a passage 290*f* configured to communicate with an outside of the housing 1*a*. One end portion of the fifth connection passage 59 configured to communicate with the switch valve 270 is connected to the second space 291*b*, so that the compressed air can be supplied to the timer valve 280 or the compressed air can be exhausted from the timer valve 280 via the fifth connection passage 59.

The second piston shaft part 295 is a rod-shaped columnar body, and a rear end portion of the second piston shaft part 295 is attached to a front end portion of the second tinier piston 294. The second piston shaft part 295 can move in the front and rear direction in a through-hole 290*d* formed between the second timer piston 294 and the control valve 240. A front end portion of the second piston shaft part 295 is provided to appear and disappear with respect to the inside of the cylinder 242 of the control valve 240, and is configured to actuate the control valve 240 by pressing the rear end face of the control valve stem 244 constituting the control valve 240.

In the present embodiment, as shown in FIGS. 13 and 15A, the timer valve 280 is arranged in the grip part 4 so that moving directions of the first timer piston 284 and the second timer piston 294 are different from, in the present embodiment, orthogonal to, the axial direction of the cylinder 26 (the moving direction of the driver 22). In addition, the timer valve 280 is arranged in the grip part 4 so that the moving directions of the first timer piston 284 and the second timer piston 294 are along the extension direction of the grip part 4, i.e., are parallel to the extension direction of the grip part 4.

[Operation Example of Nailing Machine 200]

Subsequently, an example of a striking operation of the nailing machine 200 according to the second embodiment is described with reference to FIGS. 13 to 15B, and the like.

When the air hose is connected to the air plug 8 of the nailing machine 200 shown in FIG. 13, the compressed air is supplied into the main chamber 5. The compressed air supplied into the main chamber 5 is supplied to the second space 291*b* of the timer valve 280 via the inside of the switch valve 270 and the fifth connection passage 59.

Along with this, the second timer piston 294 is urged backward by the compressed air, so that the first timer piston 284 is retreated to the initial position in the cylinder 290.

Continuously, when the trigger lever 11 is pulled by the operator, the switch valve stem 274 of the switch valve 270 is pushed up by the contact lever 12, so that the switch valve 270 is actuated. Thereby, the compressed air in the timer valve 280 is exhausted to the blow back chamber 28 at the atmospheric pressure via the fifth connection passage 59, the inside of the switch valve 270 and the first connection passage 29.

When the compressed air in the second space 291*b* of the cylinder 290 is exhausted, the first timer piston 284 is advanced by the urging of the compression spring 289. As shown in FIGS. 15A and 15B, when the rear end portion 284*e* of the first timer piston 284 passes through the first section R1, the atmospheric air caused to flow from the second space 281*b* into the second passage 282*b* is caused to flow into the first space 281*a* through the throttle portion 288 of the second passage 282*b*. The flow rate of the atmospheric air that is supplied to the first space 281*a* is restricted to be constant by the throttle portion 288. Thereby, the first timer piston 284 is slowly advanced from the initial position in the first chamber 290 and the time measurement (timer) of the timer valve 280 starts. The timer valve 280 measures the set prescribed time until reaching the second section R2.

Continuously, when the rear end portion of the first timer piston 284 starts to pass through the bypass passage 282*c* of the second section R2, a communication destination of the bypass passage 282*c* is switched from the second space 281*b* to the first space 281*a*. In the present embodiment, the cross-sectional area of the bypass passage 282*c* is designed greater than the cross-sectional area of the throttle portion 288, and the flow resistance of the bypass passage 282*c* is set smaller than the flow resistance of the throttle portion 288. For this reason, the atmospheric air entering from the second space 281*b* passes through the bypass passage 282*c*, not the throttle portion 288 of the second passage 282*b*, and flows into the first space 281*a*. In this case, the flow rate of the atmospheric air caused to flow from the second space 281*b* into the first space 281*a* is larger in the second section R2 than in the first section R1. Therefore, the moving speed of the first timer piston 284 also further increases in the second section R2 than in the first section R1.

As described above, according to the second embodiment, the load at the time when the first timer piston 284 is moved is reduced in the second section R2 immediately before actuation of the control valve 240, so that the moving speed of the first timer piston 284 and the like can be increased and the control valve stem 244 can be pushed with a strong force by the second piston shaft part 295. Thereby, the control valve 240 can be actuated securely and with high accuracy. In addition, according to the second embodiment, since the first chamber 281 configured to accommodate the first timer piston 284 is constituted by the closed space, it is possible to apply the constant resistance to the first timer piston 284 all the time in the first section R1. Thereby, the moving speed of the first timer piston 284 can be maintained constant, so that the time measurement can be stabilized.

Further, since the timer valve 280 is arranged in the grip part 4 so that the moving direction of the first timer piston 284 of the timer valve 280 is orthogonal to the moving direction of the striking mechanism 20, it is possible to prevent the timer valve 280 from receiving a shock that is generated upon the striking operation of the striking mechanism 20. Thereby, it is possible to prevent an erroneous operation of the timer valve 280, so that it is possible to stabilize the operation of the timer valve 280.

Note that, in the second embodiment, the means for making the resistance to the first timer piston 284 in the second section R2 smaller than the resistance to the first timer piston 284 in the first section R1 is not limited to changing the area of the passage. For example, a plurality of bypass passages 282*c* whose cross-sectional areas are greater than the throttle portion 288 may be provided.

Note that, the technical scope of the present invention is not limited to the above-described embodiments, and the above-described embodiments can be variously changed without departing from the gist of the present invention. Specifically, in the above embodiments, the nailing machines 100 and 200 have been described as an example of the pneumatic tool. However, the present invention is not limited thereto. For example, as the pneumatic tool, the present invention can be applied to a screw fastening tool, a screw driving tool and the like.

In addition, in the second embodiment, the example where the control valve 240 is arranged between the head valve 30 and the trigger valve 50 has been described. However, the present invention is not limited thereto. For example, the control valve 240 may also be arranged in the trigger valve 50. In addition, in the second embodiment, the passage between the head valve 30 and the trigger valve 50 is shut off by the control valve 240. However, the present invention is not limited thereto. For example, a structure where the actuation of the head valve 30 is mechanically disabled by the control valve 240 can be adopted. Further, in the second embodiment, the moving range of the control valve 240 is divided into the first section R1 and the second section R2. However, the present invention is not limited thereto. For example, a configuration where the control valve 240 is actuated in a state of being pressed from a first stage by the timer valve 280 and the passage between the head valve 30 and the timer valve 50 is completely shut off when the predetermined time elapses may also be adopted. Further, in the first and second embodiments, the second control valve 60 and the control valve 240 are actuated by being pressed. However, the present invention is not limited thereto. For example, the second control valve 60 and the control valve 240 may also be actuated by being pulled. In the second embodiment, the example where the control valve 240 disables actuation of the head valve 30 has been described. However, instead of this, a configuration where the control valve 240 disables actuation of the trigger valve 50 may also be adopted.

The present application is based on Japanese Patent Application No. 2019-086671 filed on Apr. 26, 2019, the contents of which are incorporated herein by reference.

REFERENCE SIGNS LIST

1: main body
4: grip part
5: main chamber

11: trigger lever (trigger)
20: striking mechanism (drive mechanism)
22: driver
24: piston
26: cylinder
28: blow back chamber
30: head valve
38: head valve chamber (first chamber)
40: first control valve
50: trigger valve
60: second control valve
55: empty chamber (second chamber)
80: timer valve
84: first timer piston
85: first piston shaft part
88*a*: O-ring
100, 200: nailing machine (pneumatic tool)
280: timer valve
282*c*: bypass passage
284: first timer piston (valve body)
285: first piston shaft part (valve body)
288: throttle portion
R1: first section
R2: second section

The invention claimed is:

1. A pneumatic tool comprising:

a main chamber configured to reserve compressed air supplied from an air source;

a drive mechanism configured to drive by an air pressure of the compressed air by the compressed air reserved in the main chamber being supplied;

a head valve having a first chamber configured to reserve the compressed air that is supplied from the air source, and configured to be actuated depending on pressure fluctuation in the first chamber to allow the compressed air to be supplied from the main chamber to the drive mechanism;

a trigger valve configured to actuate the head valve by exhausting the compressed air in the first chamber; and a control valve configured to disable exhaustion of the compressed air of the first chamber by the trigger valve.

2. The pneumatic tool according to claim 1, wherein the trigger valve has a second chamber configured to reserve the compressed air, and wherein the control valve is configured to actuate the head valve by exhausting the compressed air in the second chamber of the trigger valve to exhaust the compressed air from the first chamber of the head valve.

3. The pneumatic tool according to claim 1, wherein the control valve is arranged in the trigger valve.

4. The pneumatic tool according to claim 2, further comprising a timer valve configured to actuate the control valve at a predetermined timing, based on an operation on a trigger, wherein the control valve is configured to be actuated by control of the timer valve, and to shut off the first chamber of the head valve and the trigger valve each other by maintaining a charging state of the compressed air in the second chamber of the trigger valve.

5. A pneumatic tool comprising:

a drive mechanism configured to drive by an air pressure of compressed air by compressed air reserved in a main chamber;

the main chamber to which the compressed air for driving the drive mechanism is supplied from an air source;

a head valve having a first chamber configured to reserve the compressed air that is supplied from the air source and configured to be actuated depending on pressure fluctuation in the first chamber to allow the compressed air to be supplied from the main chamber to the drive mechanism;

a trigger valve configured to actuate the head valve by exhausting the compressed air in the first chamber;

a control valve configured to disable actuation of the trigger valve or the head valve, the actuation of the head valve being disabled by controlling exhaustion of the compressed air in the first chamber; and a timer valve configured to disable actuation of the trigger valve or the head valve by actuating the control valve at a predetermined timing based on an operation on a trigger, wherein the timer valve has a valve body capable of moving to an actuation position in which the valve body acts on the control valve when a predetermined time elapses, wherein a moving range of the valve body comprises a first section in which the predetermined time is measured and a second section in which the valve body acts on the control valve, and wherein a resistance to the valve body is different between the first section and the second section.

6. The pneumatic tool according to claim 5, wherein a second resistance to the valve body in the second section is smaller than a first resistance to the valve body in the first section.

7. The pneumatic tool according to claim 5, further comprising a cylinder in which an atmospheric air is filled and the valve body is accommodated to be movable, wherein the cylinder has a passage through which the atmospheric air flows in conjunction with movement of the valve body, and wherein the second resistance is made smaller than the first resistance by changing an area of the passage between the first section and the second section wherein the timer valve is arranged in a grip part.

8. The pneumatic tool according to claim 5, further comprising a cylinder in which an atmospheric air is filled and the valve body is accommodated to be movable, wherein the cylinder has a plurality of passages through which the atmospheric air flows in conjunction with movement of the valve body, and wherein the second resistance is made smaller than the first resistance by changing a number of the passages, through which the atmospheric air passes, between the first section and the second section.

* * * * *